United States Patent
Buckley

(10) Patent No.: US 9,230,345 B2
(45) Date of Patent: Jan. 5, 2016

(54) DISPLAY APPARATUS CONFIGURED FOR DISPLAY OF LOWER RESOLUTION COMPOSITE COLOR SUBFIELDS

(71) Applicant: Pixtronix, Inc., San Diego, CA (US)

(72) Inventor: Edward Buckley, Melrose, MA (US)

(73) Assignee: Pixtronix, Inc., San Diego, CA (US)

( * ) Notice: Subject to any disclaimer, the term of this patent is extended or adjusted under 35 U.S.C. 154(b) by 16 days.

(21) Appl. No.: 14/044,341

(22) Filed: Oct. 2, 2013

(65) Prior Publication Data

US 2015/0091932 A1    Apr. 2, 2015

(51) Int. Cl.
G06T 11/00    (2006.01)
G09G 3/20    (2006.01)

(52) U.S. Cl.
CPC ............ *G06T 11/001* (2013.01); *G09G 3/2022* (2013.01); *G09G 2310/0235* (2013.01); *G09G 2340/06* (2013.01); *G09G 2360/16* (2013.01)

(58) Field of Classification Search
CPC ............... G09G 2310/0235; G09G 3/2202; G09G 2340/06; G09G 2360/16; G06T 11/001
USPC ............... 345/204–215, 589–602, 690–699; 382/162–172
See application file for complete search history.

(56) References Cited

U.S. PATENT DOCUMENTS

| | | | |
|---|---|---|---|
| 7,176,879 B1 * | 2/2007 | Yoshihara | G09G 3/3413 345/102 |
| 8,314,761 B2 | 11/2012 | Takada et al. | |
| 2002/0122019 A1 | 9/2002 | Baba et al. | |
| 2003/0231194 A1 | 12/2003 | Morgan et al. | |
| 2007/0200807 A1 * | 8/2007 | Lee et al. | 345/88 |
| 2008/0246891 A1 | 10/2008 | Russell et al. | |
| 2008/0259099 A1 | 10/2008 | Arai et al. | |
| 2009/0219244 A1 * | 9/2009 | Fletcher et al. | 345/102 |
| 2010/0265281 A1 * | 10/2010 | Furukawa et al. | 345/691 |
| 2010/0289834 A1 | 11/2010 | Lee et al. | |
| 2012/0206513 A1 | 8/2012 | Ueno | |
| 2013/0033526 A1 | 2/2013 | Hsu et al. | |
| 2013/0169663 A1 * | 7/2013 | Seong et al. | 345/589 |

OTHER PUBLICATIONS

International Search Report and Written Opinion—PCT/US2014/055846—ISA/EPO—Dec. 11, 2014.

* cited by examiner

*Primary Examiner* — Lun-Yi Lao
*Assistant Examiner* — Elliott Deaderick
(74) *Attorney, Agent, or Firm* — Edward A. Gordon; Foley & Lardner LLP

(57) ABSTRACT

Systems, methods and apparatus for image formation improve power efficiency of display devices by displaying low resolution composite color subfields. In some implementations, a display controller receives data indicative of a plurality of pixel values included in an image frame and derives a plurality of initial component color subfields. The display controller then derives a composite color subfield including a plurality of common composite color intensity values assigned to respective pixel blocks. Each pixel block is associated with a plurality of pixels. The display controller derives a plurality of updated component color subfields based on the initial component color subfields and the composite color subfield.

18 Claims, 14 Drawing Sheets

Grid 604:

| R=0 G=50 B=100 W=100 | R=50 G=0 B=125 W=75 | R=0 G=50 B=100 W=100 | R=0 G=20 B=100 W=105 |
|---|---|---|---|
| R=20 G=0 B=80 W=100 | R=0 G=50 B=100 W=100 | R=20 G=0 B=80 W=100 | R=50 G=0 B=125 W=75 |
| R=50 G=0 B=125 W=75 | R=20 G=0 B=80 W=100 | R=0 G=50 B=100 W=100 | R=0 G=20 B=100 W=105 |
| R=0 G=20 B=100 W=105 | R=20 G=0 B=80 W=100 | R=0 G=50 B=100 W=100 | R=0 G=20 B=100 W=105 |

Grid 602:

| R=100 G=150 B=200 | R=125 G=75 B=200 | R=120 G=100 B=180 | R=105 G=125 B=205 |
|---|---|---|---|
| R=120 G=100 B=180 | R=100 G=150 B=200 | R=120 G=100 B=180 | R=125 G=75 B=200 |
| R=125 G=75 B=200 | R=120 G=100 B=180 | R=100 G=150 B=200 | R=105 G=125 B=205 |
| R=120 G=100 B=180 | R=125 G=75 B=200 | R=105 G=125 B=205 | R=100 G=150 B=200 |

| 1102 → | | | |
|---|---|---|---|
| R=100 G=150 B=200 | R=125 G=75 B=200 | R=120 G=100 B=180 | R=105 G=125 B=205 |
| R=120 G=100 B=180 | R=100 G=150 B=200 | R=120 G=100 B=180 | R=125 G=75 B=200 |
| R=125 G=75 B=200 | R=120 G=100 B=180 | R=100 G=150 B=200 | R=105 G=125 B=205 |
| R=250 G=200 B=255 | R=225 G=255 B=200 | R=105 G=125 B=205 | R=100 G=150 B=200 |

| 1120 → | | | |
|---|---|---|---|
| W=100 | W=75 | W=100 | W=105 |
| W=100 | W=100 | W=100 | W=75 |
| W=75 | W=100 | W=100 | W=105 |
| W=200 | W=200 | W=105 | W=100 |

| | | | |
|---|---|---|---|
| R=25 G=75 B=125 W=75 | R=50 G=0 B=125 W=75 | R=45 G=25 B=105 W=75 | R=30 G=50 B=130 W=75 |
| R=45 G=25 B=105 W=75 | R=25 G=75 B=125 W=75 | R=45 G=25 B=105 W=75 | R=50 G=0 B=125 W=75 |
| R=50 G=0 B=125 W=75 | R=45 G=25 B=105 W=75 | R=0 G=50 B=100 W=100 | R=5 G=25 B=105 W=100 |
| R=50 G=0 B=55 W=200 | R=25 G=55 B=0 W=200 | R=5 G=25 B=105 w=100 | R=0 G=50 B=100 W=100 |

1152a, 1152b, 1152c, 1152d, 1152e, 1152f

DISPLAY APPARATUS CONFIGURED FOR DISPLAY OF LOWER RESOLUTION COMPOSITE COLOR SUBFIELDS

TECHNICAL FIELD

This disclosure relates to the field of displays, and in particular, to image formation processes used by displays.

DESCRIPTION OF THE RELATED TECHNOLOGY

Electromechanical systems (EMS) devices include devices having electrical and mechanical elements, such as actuators, optical components (such as mirrors, shutters, and/or optical film layers) and electronics. EMS devices can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of deposited material layers, or that add layers to form electrical and electromechanical devices.

EMS-based display apparatus have been proposed that include display elements that modulate light by selectively moving a light blocking component into and out of an optical path through an aperture defined through a light blocking layer. Doing so selectively passes light from a backlight or reflects light from the ambient or a front light to form an image.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus that includes an array of light modulators and a controller coupled to the array of light modulators. The array of light modulators includes a plurality of light modulators arranged in multiple rows and multiple columns. The controller is capable of receiving data indicative of a plurality of pixel values included in an image frame and deriving a plurality of initial component color subfields based on the pixel values. Each initial component color subfield includes intensity values for a respective component color. The controller is further capable of deriving a composite color subfield that includes a plurality of common composite color intensity values assigned to respective pixel blocks based on the initial component color subfields. Each pixel block is associated with a plurality of pixels. The controller is also capable of deriving a plurality of updated component color subfields based on the initial component color subfields and the composite color subfield.

In some implementations, the pixel blocks include pixels in multiple adjacent rows of the image frame. In some other implementations, the pixel blocks include pixels in multiple adjacent rows and multiple adjacent columns of the image frame. In some implementations, the controller is further capable of loading at least one image subframe corresponding to the composite color subfield into the array of light modulators multiple rows at a time.

In some implementations, the controller is further configured to divide the image frame into the pixel blocks. In some implementations, the image frame is divided by calculating a difference between a color intensity value associated with a pixel and at least one color intensity value associated with at least one pixel in an existing pixel block. The difference is compared to a threshold and the pixel is added to a new pixel block in response to the difference exceeding the threshold.

In some implementations, the apparatus also includes a memory. The memory can be memory capable of storing subframe data associated with color subfields. The memory can further be configured to store less data in association with the composite color subfield than in association with the component color subfields.

In some implementations, the deriving the composite color subfield can include, for each pixel block, identifying a minimum composite color intensity value for the pixels associated with the pixel block. In some other implementations, deriving a composite color subfield includes, for each pixel block, identifying a minimum component color intensity value for the pixels associated with the pixel block.

In some implementations, deriving the plurality of updated component color subfields includes reducing the intensity values for pixels in the initial component color subfields by the common color intensity values of the respective pixel blocks.

In some implementations, the apparatus can include a display. The apparatus also can include a processor that is capable of communicating with the display, the processor being capable of processing image data. The apparatus also can include a memory device that is capable of communicating with the processor.

In some implementations, the apparatus can include a driver circuit capable of sending at least one signal to the display and a controller capable of sending at least a portion of the image data to the driver circuit. In some implementations, the apparatus can include an image source module capable of sending the image data to the processor. The image source module can include a receiver, a transceiver, and/or a transmitter. In some implementations, the apparatus can include an input device capable of receiving input data and communicating the input data to the processor.

Another innovative aspect of the subject matter described in this disclosure can be implemented in a method of processing an image for a display. The method includes receiving image data indicative of a plurality of pixel values included in the image frame and deriving a plurality of initial component color subfields based on the pixel values. Each initial component color subfield includes pixel intensity values for a respective component color. The method further includes deriving a composite color subfield including a plurality of common composite color intensity values assigned to respective pixel blocks based on the initial component color subfields. Each pixel block is associated with a plurality of pixels. In some implementations, the pixel blocks include pixels in multiple adjacent rows of the image frame. In addition, the method includes deriving a plurality of updated component color subfields based on the initial component color subfields and the composite color subfield.

In some implementations, deriving a composite color subfield includes, for each pixel block, identifying a minimum composite color intensity value for the pixels associated with the pixel block. In some implementations, the method also includes dividing the image block into the pixel blocks. This can be done by calculating a difference between a color intensity value associated with a pixel and at least one color intensity value associated with at least one pixel in an existing pixel block, and comparing the difference to a threshold. In response to the difference exceeding the threshold, the pixel is added to a new pixel block.

In some implementations, the method also includes comprising storing subframe data associated with color subfields in a memory. The memory is configured to store less data in association with the composite color subfield than in association with the component color subfields.

Another innovative aspect of the subject matter described in this disclosure can be implemented in a non-transitory processor readable medium storing instructions, which, when executed by one or more processors, cause the one or more processors to carry out a method. The method includes receiving image data indicative of a plurality of pixel values included in the image frame and deriving a plurality of initial component color subfields based on the pixel values. Each initial component color subfield includes pixel intensity values for a respective component color. The method further includes deriving a composite color subfield including a plurality of common composite color intensity values assigned to respective pixel blocks based on the initial component color subfields. Each pixel block is associated with a plurality of pixels. In addition, the method includes deriving a plurality of updated component color subfields based on the initial component color subfields and the composite color subfield. In some implementations, the method caused to be carried by the computer readable instructions includes dividing the image frame into pixel blocks based on the content of the image.

In some implementations, the apparatus further includes a display, a processor that is configured to communicate with the display, the processor being configured to process image data, and a memory device that is configured to communicate with the processor.

In some implementations, the display further includes a driver circuit configured to send at least one signal to the display, and a controller configured to send at least a portion of the image data to the driver circuit. In some implementations, the display further includes an image source module configured to send the image data to the processor, where the image source module includes at least one of a receiver, transceiver, and transmitter, and an input device configured to receive input data and to communicate the input data to the processor.

Details of one or more implementations of the subject matter described in this specification are set forth in the accompanying drawings and the description below. Although the examples provided in this summary are primarily described in terms of MEMS-based displays, the concepts provided herein may apply to other types of displays, such as liquid crystal displays (LCDs), organic light emitting diode (OLED) displays, electrophoretic displays, and field emission displays, as well as to other non-display MEMS devices, such as MEMS microphones, sensors, and optical switches. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an example processing of an image frame by subfield derivation logic shown in FIG. 4.

FIGS. 11A-11C show an example execution of the image processing method shown in FIG. 10.

Like reference numbers and designations in the various drawings indicate like elements.

DETAILED DESCRIPTION

Figure 1A:
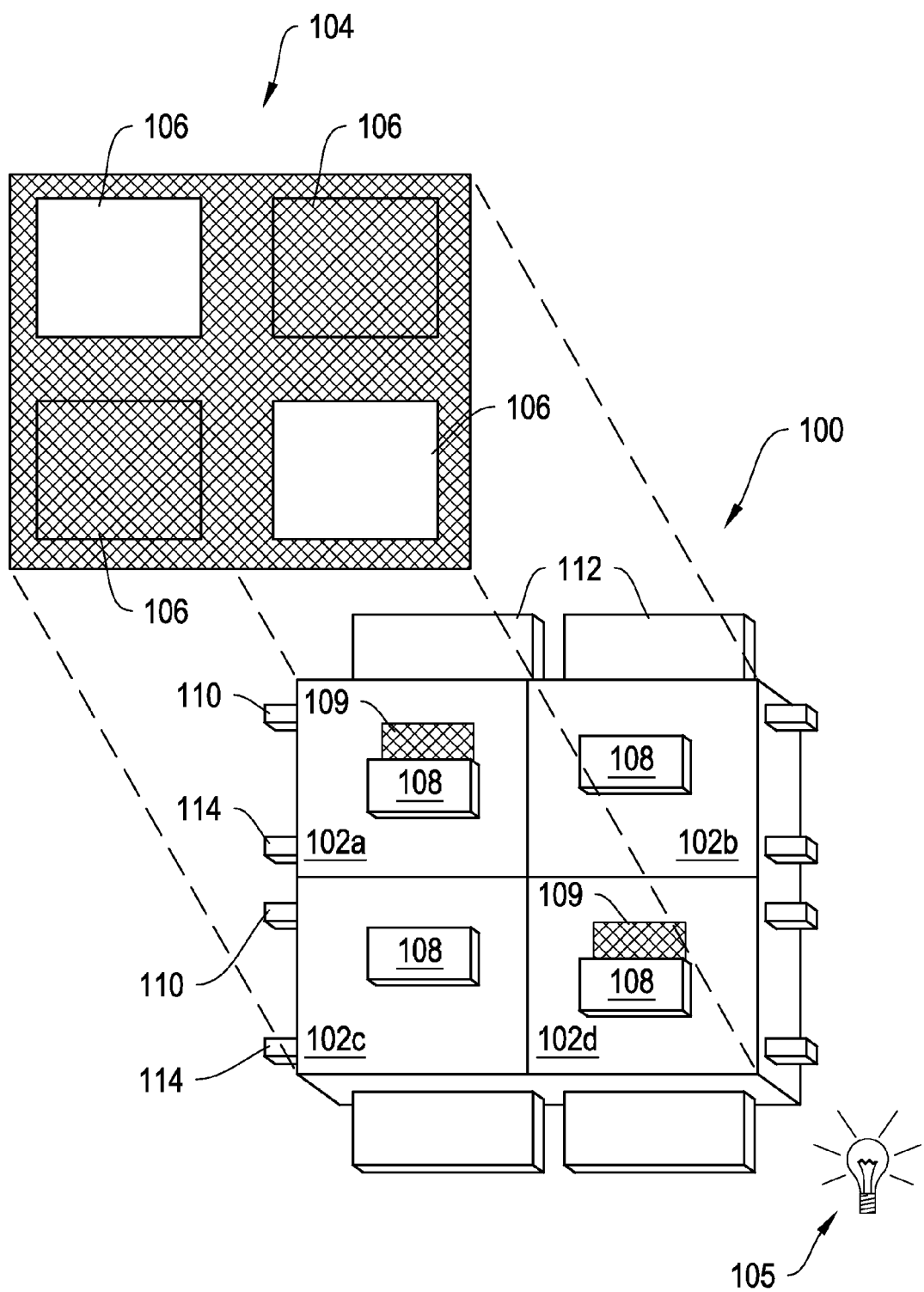
FIG. 1A shows a schematic diagram of an example direct-view microelectromechanical systems (MEMS) based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Various display apparatuses have been proposed that form images using a combination of component contributing colors (hereinafter referred to as "component colors")(such as red, green, and blue) and a composite contributing color (hereinafter referred to as "composite colors")(i.e., a color that is formed from the combination of two or more component colors). Example composite colors include white, yellow, cyan, and magenta, etc. Using a composite color to form an image can help reduce power consumption of the display, and in field sequential displays, also can reduce image artifacts such as color breakup.

In many cases, much of the benefit of using a composite color subfield can be achieved by using the composite color subfield primarily to provide image luminance, without providing much image detail. Such image detail can be output through the component color subfields. Accordingly, in some implementations, a display can derive a common composite color intensity value for a group or block of pixels, instead of generating a separate composite color intensity value for each and every pixel in the image frame. Display element state data associated with such common composite color subfields (in the form of image subframes, for example) can be loaded into multiple rows of display elements simultaneously. In some implementations, the pixels of an image frame can be dynamically grouped based on the content of the image frame.

By grouping pixels from adjacent rows together into pixel blocks for the purposes of deriving a composite color subfield, a display can expedite the loading of display element state data associated with the composite color subfield into an array of display elements. This is because the state data for display elements in the adjacent rows will be identical. Thus, composite color subframes can be loaded into the array of display elements in a fraction of the time it would take were separate composite color intensity values determined for each pixel in the image. The time saved through such an addressing process can be used to display one or more composite color and/or component color subframes for a longer duration using a more energy efficient backlight illumination level, to output additional component color subframes, or to otherwise alter an output sequence employed by the display to improve image quality or to reduce power consumption. In implementations in which pixel groupings are made dynamically based on the content of an image, addressing time can still be decreased, while reducing the potential for image artifacts.

Moreover, by grouping pixels together in the composite color subfield to form pixel blocks, a display can include a smaller frame buffer. In such implementations, the display does not need to save data for as many distinct pixels in relation to either the composite color subfield or the subframes generated based on the composite color subfield. The use of a smaller memory reduces the cost as well as the power consumption of the display.

FIG. 1A shows a schematic diagram of an example direct-view MEMS-based display apparatus 100. The display apparatus 100 includes a plurality of light modulators 102a-102d (generally light modulators 102) arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the user sees the image by looking directly at the display apparatus, which contains the light modulators and optionally a backlight or front light for enhancing brightness and/or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent or glass substrates to facilitate a sandwich assembly arrangement where one substrate, containing the light modulators, is positioned over the backlight.

Each light modulator 102 can include a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix connected to the substrate and to the light modulators for controlling the movement of the shutters. The control matrix includes a series of electrical interconnects (such as interconnects 110, 112 and 114), including at least one write-enable interconnect 110 (also referred to as a scan-line interconnect) per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other nonlinear circuit elements that control the application of separate actuation voltages, which are typically higher in magnitude than the data voltages, to the light modulators 102. The application of these actuation voltages then results in the electrostatic driven movement of the shutters 108.

Figure 1B:
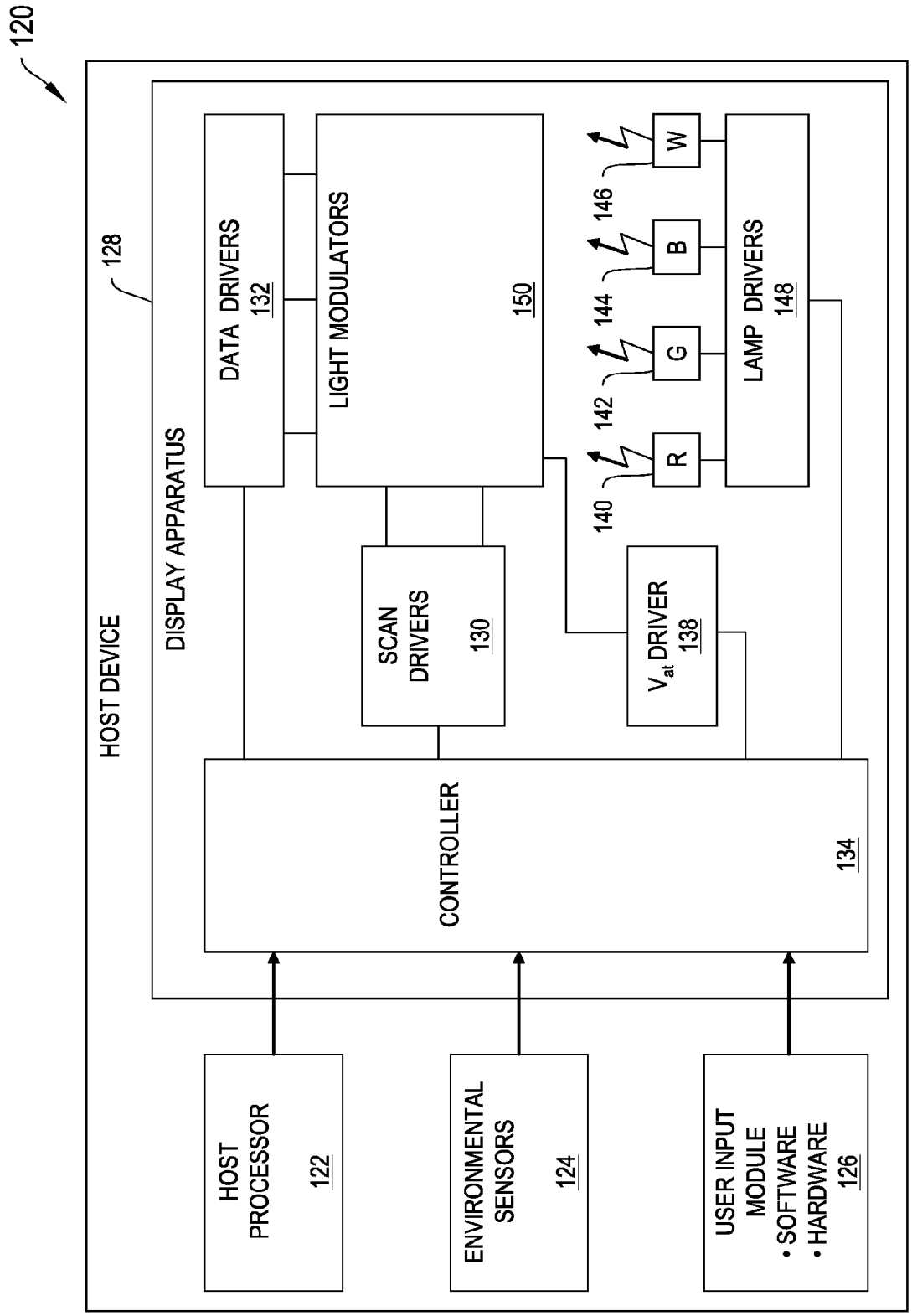
FIG. 1B shows a block diagram of an example host device.

FIG. 1B shows a block diagram of an example host device 120 (i.e., cell phone, smart phone, PDA, MP3 player, tablet, e-reader, netbook, notebook, watch, etc.). The host device 120 includes a display apparatus 128, a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array 150 of display elements, such as the light modulators 102 shown in FIG. 1A. The scan drivers 130 apply write enabling voltages to scanline interconnects 110. The data drivers 132 apply data voltages to the data interconnects 112.

In some implementations of the display apparatus, the data drivers 132 are configured to provide analog data voltages to the array 150 of display elements, especially where the luminance level of the image 104 is to be derived in analog fashion. In analog operation, the light modulators 102 are designed such that when a range of intermediate voltages is applied through the data interconnects 112, there results a range of intermediate open states in the shutters 108 and therefore a range of intermediate illumination states or luminance levels in the image 104. In other cases, the data drivers 132 are configured to apply only a reduced set of 2, 3 or 4 digital voltage levels to the data interconnects 112. These voltage levels are designed to set, in digital fashion, an open state, a closed state, or other discrete state to each of the shutters 108.

The scan drivers 130 and the data drivers 132 are connected to a digital controller circuit 134 (also referred to as the controller 134). The controller sends data to the data drivers 132 in a mostly serial fashion, organized in sequences, which may be predetermined, grouped by rows and by image frames. The data drivers 132 can include series to parallel data converters, level shifting, and for some applications digital to analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 114. In some other implementations, the common drivers 138, following commands from the controller 134, issue voltage pulses or signals to the array 150 of display elements, for instance global actuation pulses which are capable of driving and/or initiating simultaneous actuation of all display elements in multiple rows and columns of the array 150.

All of the drivers (such as scan drivers 130, data drivers 132 and common drivers 138) for different display functions are time-synchronized by the controller 134. Timing commands from the controller coordinate the illumination of red, green, blue and white lamps (140, 142, 144 and 146 respectively) via lamp drivers 148, the write-enabling and sequencing of specific rows within the array 150 of display elements, the output of voltages from the data drivers 132, and the output of voltages that provide for display element actuation. In some implementations, the lamps are light emitting diodes (LEDs).

The controller 134 determines the sequencing or addressing scheme by which each of the shutters 108 can be re-set to the illumination levels appropriate to a new image 104. New images 104 can be set at periodic intervals. For instance, for video displays, the color images 104 or frames of video are refreshed at frequencies ranging from 10 to 300 Hertz (Hz). In some implementations the setting of an image frame to the array 150 is synchronized with the illumination of the lamps 140, 142, 144 and 146 such that alternate image frames are illuminated with an alternating series of colors, such as red, green, blue and white. The image frames for each respective color are referred to as color subframes. In this method, referred to as the field sequential color method, if the color subframes are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, blue and white.

In some implementations, where the display apparatus 100 is designed for the digital switching of shutters 108 between open and closed states, the controller 134 forms an image by the method of time division grayscale, as previously described. In some other implementations, the display apparatus 100 can provide grayscale through the use of multiple shutters 108 per pixel.

In some implementations, the data for an image 104 state is loaded by the controller 134 to the display element array 150 by a sequential addressing of individual rows, also referred to as scan lines. For each row or scan line in the sequence, the scan driver 130 applies a write-enable voltage to the write enable interconnect 110 for that row of the array 150, and subsequently the data driver 132 supplies data voltages, corresponding to desired shutter states, for each column in the selected row. This process repeats until data has been loaded for all rows in the array 150. In some implementations, the sequence of selected rows for data loading is linear, proceeding from top to bottom in the array 150. In some other implementations, the sequence of selected rows is pseudo-randomized, in order to minimize visual artifacts. And in some other implementations, the sequencing is organized by blocks, where, for a block, the data for only a certain fraction of the image 104 state is loaded to the array 150, for instance by addressing only every $5^{th}$ row of the array 150 in sequence.

In some implementations, the process for loading image data to the array 150 is separated in time from the process of actuating the display elements in the array 150. In these implementations, the display element array 150 may include data memory elements for each display element in the array 150 and the control matrix may include a global actuation interconnect for carrying trigger signals, from common driver 138, to initiate simultaneous actuation of shutters 108 according to data stored in the memory elements.

In alternative implementations, the array 150 of display elements and the control matrix that controls the display elements may be arranged in configurations other than rectangular rows and columns. For example, the display elements can be arranged in hexagonal arrays or curvilinear rows and columns. In general, as used herein, the term scan-line shall refer to any plurality of display elements that share a write-enabling interconnect.

The host processor 122 generally controls the operations of the host. For example, the host processor 122 may be a general or special purpose processor for controlling a portable electronic device. With respect to the display apparatus 128, included within the host device 120, the host processor 122 outputs image data as well as additional data about the host. Such information may include data from environmental sensors, such as ambient light or temperature; information about the host, including, for example, an operating mode of the host or the amount of power remaining in the host's power source; information about the content of the image data; information about the type of image data; and/or instructions for display apparatus for use in selecting an imaging mode.

The user input module 126 conveys the personal preferences of the user to the controller 134, either directly, or via the host processor 122. In some implementations, the user input module 126 is controlled by software in which the user programs personal preferences such as deeper color, better contrast, lower power, increased brightness, sports, live action, or animation. In some other implementations, these preferences are input to the host using hardware, such as a switch or dial. The plurality of data inputs to the controller 134 direct the controller to provide data to the various drivers 130, 132, 138 and 148 which correspond to optimal imaging characteristics.

An environmental sensor module 124 also can be included as part of the host device 120. The environmental sensor module 124 receives data about the ambient environment, such as temperature and or ambient lighting conditions. The sensor module 124 can be programmed to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
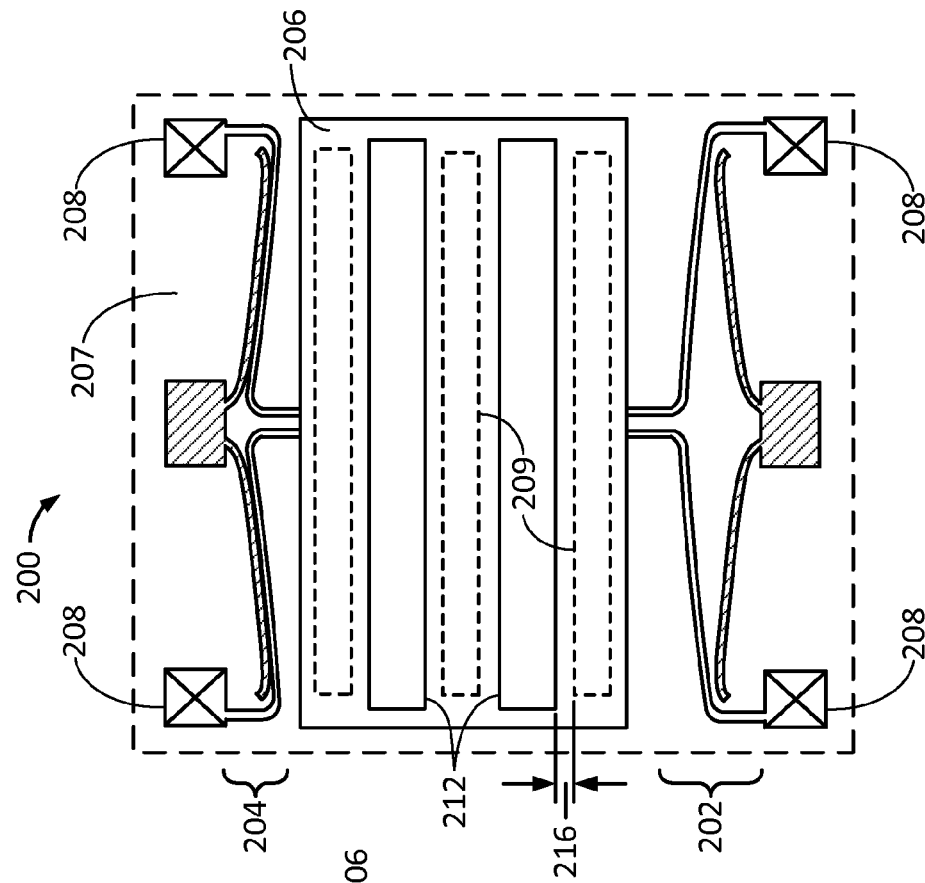
FIGS. 2A and 2B show views of an example dual actuator shutter assembly.
Figure 2B:
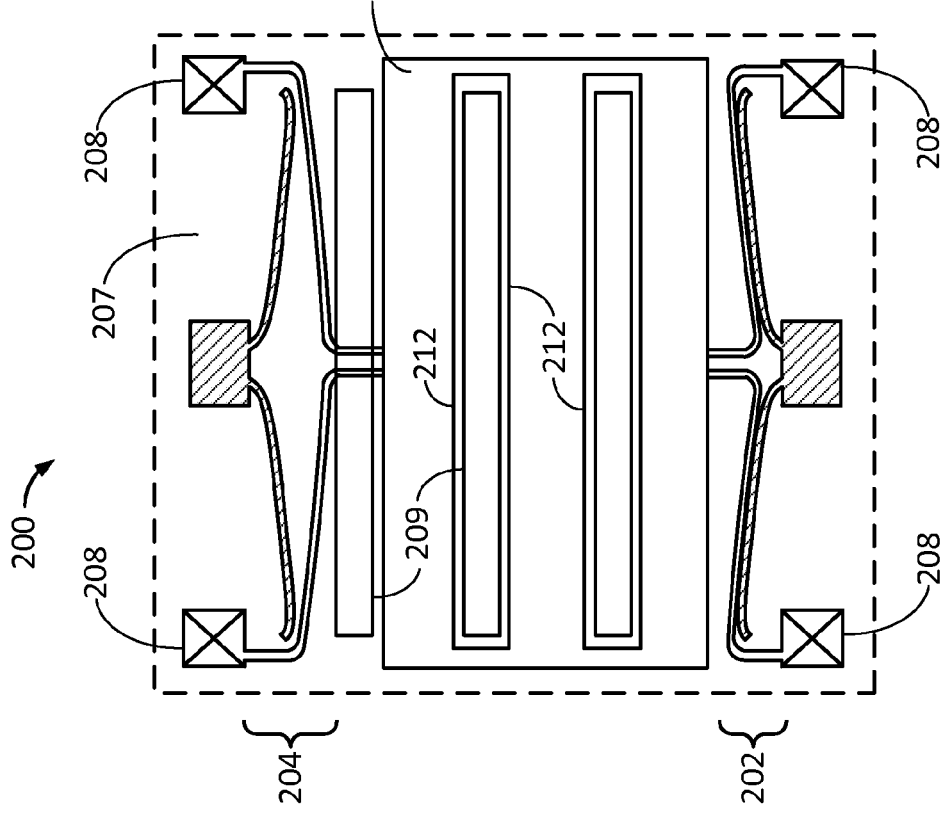

FIGS. 2A and 2B show views of an example dual actuator shutter assembly 200. The dual actuator shutter assembly 200, as depicted in FIG. 2A, is in an open state. FIG. 2B shows the dual actuator shutter assembly 200 in a closed state. In contrast to the shutter assembly 200, the shutter assembly 200 includes actuators 202 and 204 on either side of a shutter 206. Each actuator 202 and 204 is independently controlled. A first actuator, a shutter-open actuator 202, serves to open the shutter 206. A second opposing actuator, the shutter-close actuator 204, serves to close the shutter 206. Both of the actuators 202 and 204 are compliant beam electrode actuators. The actuators 202 and 204 open and close the shutter 206 by driving the shutter 206 substantially in a plane parallel to an aperture layer 207 over which the shutter is suspended. The shutter 206 is suspended a short distance over the aperture layer 207 by anchors 208 attached to the actuators 202 and 204. The inclusion of supports attached to both ends of the shutter 206 along its axis of movement reduces out of plane motion of the shutter 206 and confines the motion substantially to a plane parallel to the substrate.

The shutter 206 includes two shutter apertures 212 through which light can pass. The aperture layer 207 includes a set of three apertures 209. In FIG. 2A, the shutter assembly 200 is in the open state and, as such, the shutter-open actuator 202 has been actuated, the shutter-close actuator 204 is in its relaxed position, and the centerlines of the shutter apertures 212 coincide with the centerlines of two of the aperture layer apertures 209. In FIG. 2B the shutter assembly 200 has been moved to the closed state and, as such, the shutter-open actuator 202 is in its relaxed position, the shutter-close actuator 204 has been actuated, and the light blocking portions of the shutter 206 are now in position to block transmission of light through the apertures 209 (depicted as dotted lines).

Each aperture has at least one edge around its periphery. For example, the rectangular apertures 209 have four edges. In alternative implementations in which circular, elliptical, oval, or other curved apertures are formed in the aperture layer 207, each aperture may have only a single edge. In some other implementations, the apertures need not be separated or disjointed in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 212 and 209 in the open state, it is advantageous to provide a width or size for shutter apertures 212 which is larger than a corresponding width or size of apertures 209 in the aperture layer 207. In order to effectively block light from escaping in the closed state, it is preferable that the light blocking portions of the shutter 206 overlap the apertures 209. FIG. 2B shows an overlap 216, which in some implementations can be predefined, between the edge of light blocking portions in the shutter 206 and one edge of the aperture 209 formed in the aperture layer 207.

The electrostatic actuators 202 and 204 are designed so that their voltage-displacement behavior provides a bi-stable characteristic to the shutter assembly 200. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$.

Figure 3:
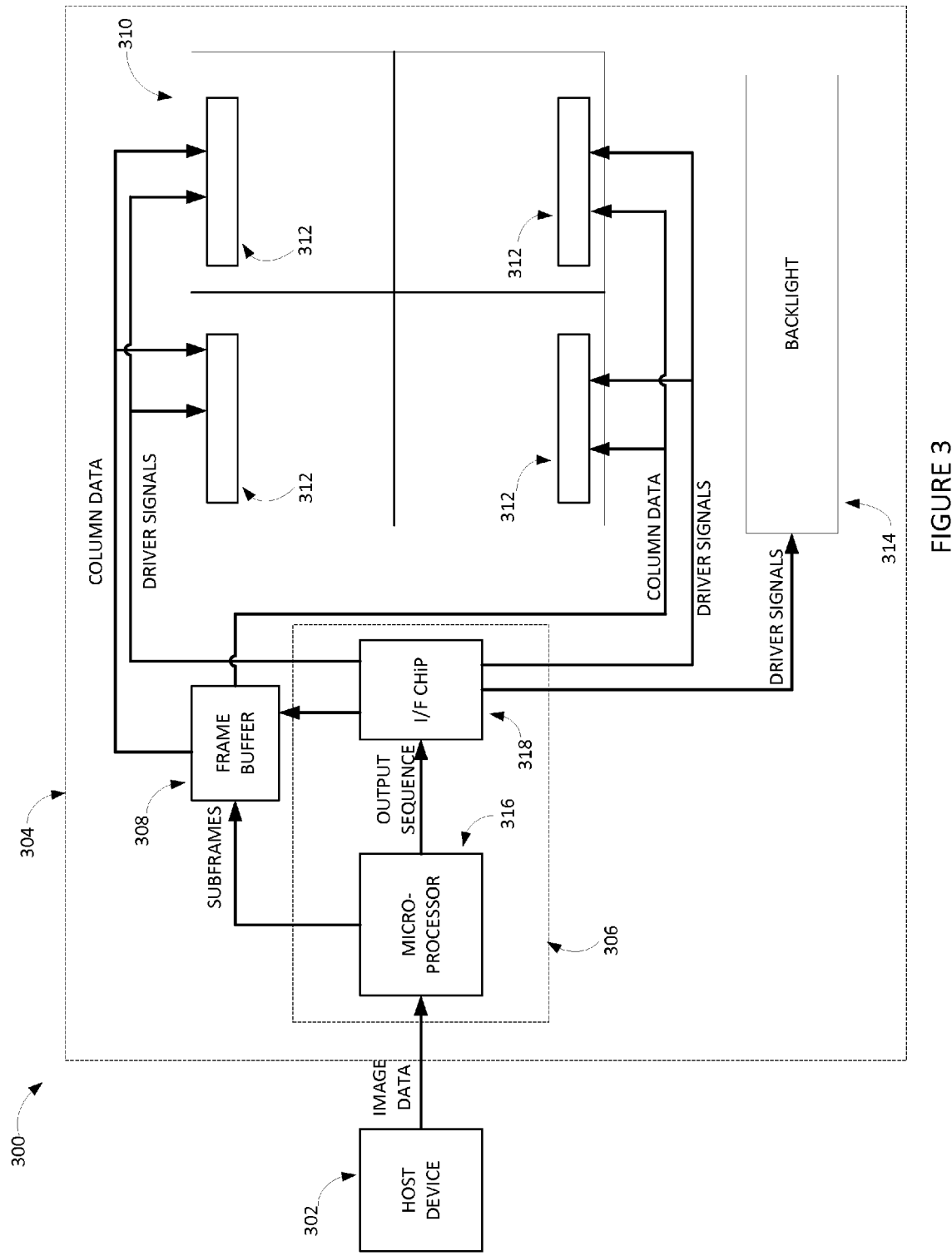
FIG. 3 shows a block diagram of an example display apparatus.

FIG. 3 shows a block diagram of an example display apparatus 300. The display apparatus 300 includes a host device 302 and a display module 304. The host device 302 can be any of a number of electronic devices, such as a portable telephone, a smartphone, a watch, a tablet computer, a laptop computer, a desktop computer, a television, a set top box, a DVD or other media player, or any other device that provides graphical output to a display. In general, the host device 302 serves as a source for image data to be displayed on the display module 304.

The display module 304 further includes control logic 306, a frame buffer 308, an array of display elements 310, display drivers 312 and a backlight 314. In general, the control logic 306 serves to process image data received from the host device 302 and controls the display drivers 312, array of display elements 310 and backlight 314 to together produce the images encoded in the image data. The functionality of the control logic 306 is described further below in relation to FIGS. 5-12.

In some implementations, as shown in FIG. 3, the functionality of the control logic 306 is divided between a microprocessor 316 and an interface (I/F) chip 318. In some implementations, the interface chip 318 is implemented in an integrated circuit logic device, such as an application specific integrated circuit (ASIC). In some implementations, the microprocessor 316 is configured to carry out all or substantially all of the image processing functionality of the control logic 306. In addition, the microprocessor 316 can be configured to determine an appropriate output sequence for the display module 304 to use to generate received images. For example, the microprocessor 316 can be configured to convert image frames included in the received image data into a set of image subframes. Each image subframe can be associated with a color and a weight, and includes desired states of each of the display elements in the array of display elements 310. The microprocessor 316 also can be configured to determine the number of image subframes to display to produce a given image frame, the order in which the image subframes are to be displayed, timing parameters associated with addressing the display elements in each subframe, and parameters associated with implementing the appropriate weight for each of the image subframes. These parameters may include, in various implementations, the duration for which each of the respective image subframes is to be illuminated and the intensity of such illumination. The collection of these parameters (i.e., the number of subframes, the order and timing of their output, and their weight implementation parameters for each subframe) can be referred to as an "output sequence."

The interface chip 318 can be configured to carry out more routine operations of the display module 304. The operations may include retrieving image subframes from the frame buffer 308 and outputting control signals to the display drivers 312 and the backlight 314 in response to the retrieved image subframe and the output sequence determined by the microprocessor 316. In some other implementations, the functionality of the microprocessor 316 and the interface chip 318 are combined into a single logic device, which may take the form of a microprocessor, an ASIC, a field programmable gate array (FPGA) or other programmable logic device. For example, the functionality of the microprocessor 316 and the interface chip 318 can be implemented by a processor 21 shown in FIG. 13B. In some other implementations, the functionality of the microprocessor 316 and the interface chip 318 may be divided in other ways between multiple logic devices, including one or more microprocessors, ASICs, FPGAs, digital signal processors (DSPs) or other logic devices.

Figure 13A:
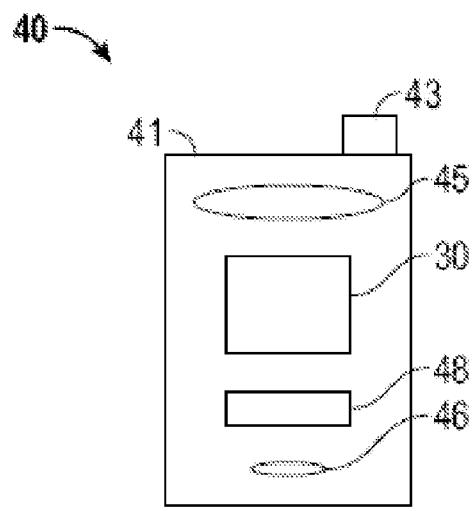
FIGS. 13A and 13B show system block diagrams of an example display device that includes a plurality of display elements.
Figure 13B:
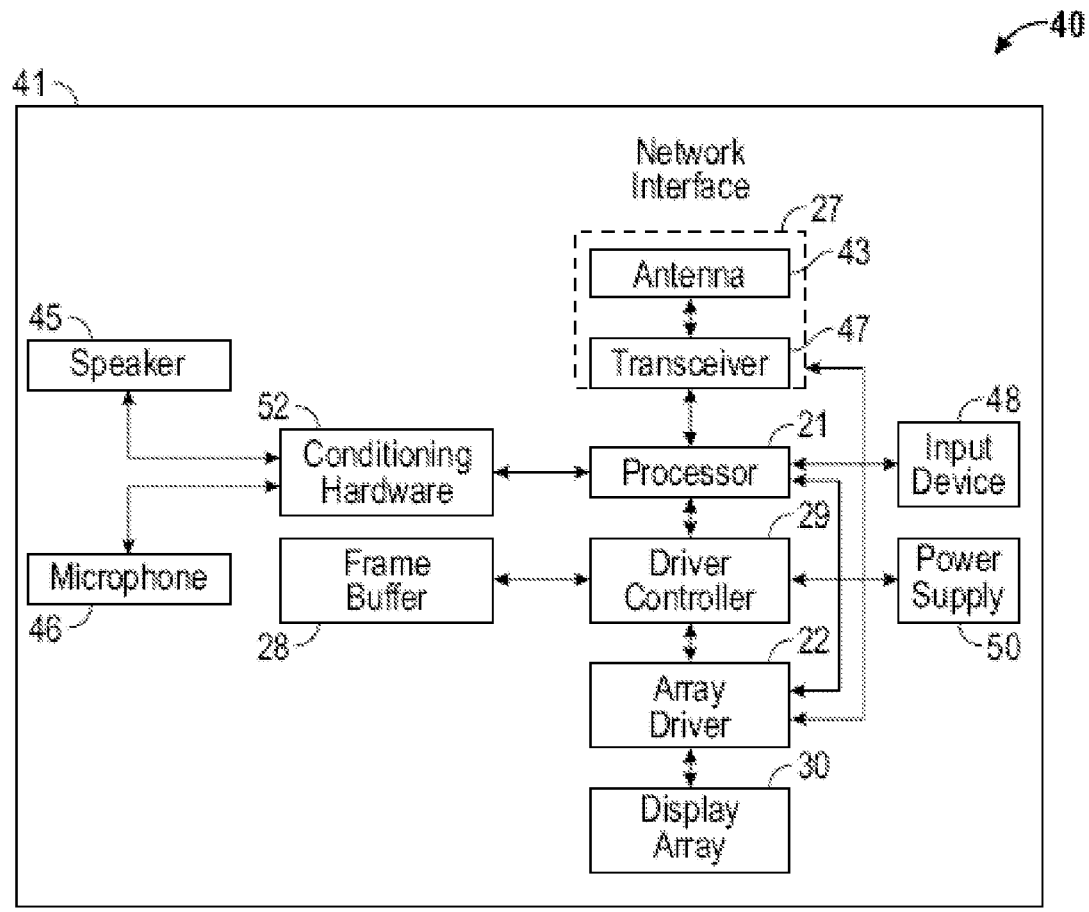

The frame buffer 308 can be any volatile or non-volatile integrated circuit memory, such as DRAM, high-speed cache memory, or flash memory (for example, the frame buffer 308 can be similar to the frame buffer 28 shown in FIG. 13B). In some other implementations, the interface chip 318 causes the frame buffer 308 to output data signals directly to the display drivers 312. The frame buffer 308 has sufficient capacity to store color subfield data and subframe data associated with at least one image frame. In some implementations, the frame buffer 308 has sufficient capacity to store color subfield data and subframe data associated with a single image frame. In some other implementations, the frame buffer 308 has sufficient capacity to store color subfield data and subframe data associated with at least two image frames. Such extra memory capacity allows for additional processing by the microprocessor 316 of image data associated with a more recently received image frame while a previously received image frame is being displayed via the array of display elements 310.

In some implementations, the display module 304 includes multiple memory devices. For example, the display module 304 may include one memory device, such as a memory directly associated with the microprocessor 316, for storing subfield data, and the frame buffer 308 is reserved for storage of subframe data.

The array of display elements 310 can include an array of any type of display elements that can be used for image formation. In some implementations, the display elements can be EMS light modulators. In some such implementations, the display elements can be MEMS shutter-based light modulators similar to those shown in FIG. 2A or 2B. In some other implementations, the display elements can be other forms of light modulators, including liquid crystal light modulators, other types of EMS- or MEMS-based light modulators, or light emitters, such as OLED emitters, configured for use with a time division gray scale image formation process.

The display drivers 312 can include a variety of drivers depending on the specific control matrix used to control the display elements in the array of display elements 310. In some implementations, the display drivers 312 include a plurality of scan drivers similar to the scan drivers 130, a plurality of data drivers similar to the data drivers 132, and a set of common drivers similar to the common drivers 138, all shown in FIG. 1B. As described above, the scan drivers output write enabling voltages to rows of display elements, while the data drivers output data signals along columns of display elements. The common drivers output signals to display elements in multiple rows and multiple columns of display elements.

In some implementations, particularly for larger display modules 304, the control matrix used to control the display elements in the array of display elements 310 is segmented into multiple regions. For example, the array of display elements 310 shown in FIG. 3 is segmented into four quadrants. A separate set of display drivers 312 is coupled to each quadrant. Dividing a display into segments in this fashion reduces the propagation time needed for signals output by the display drivers to reach the furthest display element coupled to a given driver, thereby decreasing the time needed to address the display. Such segmentation also can reduce the power requirements of the drivers employed.

In some implementations, the display elements in the array of display elements can be utilized in a direct-view transmissive display. In direct-view transmissive displays, the display elements, such as EMS light modulators, selectively block light that originates from a backlight, such as the backlight 314, which is illuminated by one or more lamps. Such display elements can be fabricated on transparent substrates, made, for example, from glass. In some implementations, the display drivers 312 are coupled directly to the glass substrate on which the display elements are formed. In such implementations, the drivers are built using a chip-on-glass configuration. In some other implementations, the drivers are built on a separate circuit board and the outputs of the drivers are coupled to the substrate using, for example, flex cables or other wiring.

The backlight 314 can include a light guide, one or more light sources (such as LEDs), and light source drivers. The light sources can include light sources of multiple colors, such as red, green, blue, and in some implementations white. The light source drivers are configured to individually drive the light sources to a plurality of discrete light levels to enable illumination gray scale and/or content adaptive backlight control (CABC) in the backlight. In addition, lights of multiple colors can be illuminated simultaneously at various intensity levels to adjust the chromaticities of the component colors used by the display, for example to match a desired color gamut. Lights of multiple colors can also be illuminated to form composite colors. For displays employing red, green, and blue component colors, the display may utilize a composite color white, yellow, cyan, magenta, or any other color formed from a combination of two or more of the component colors.

The light guide distributes the light output by light sources substantially evenly beneath the array of display elements 310. In some other implementations, for example for displays including reflective display elements, the display apparatus 300 can include a front light or other form of lighting instead of a backlight. The illumination of such alternative light sources can likewise be controlled according to illumination grayscale processes that incorporate content adaptive control features. For ease of explanation, the display processes discussed herein are described with respect to the use of a backlight. However, it would be understood by a person of ordinary skill that such processes also may be adapted for use with a front light or other similar form of display lighting.

Figure 4:
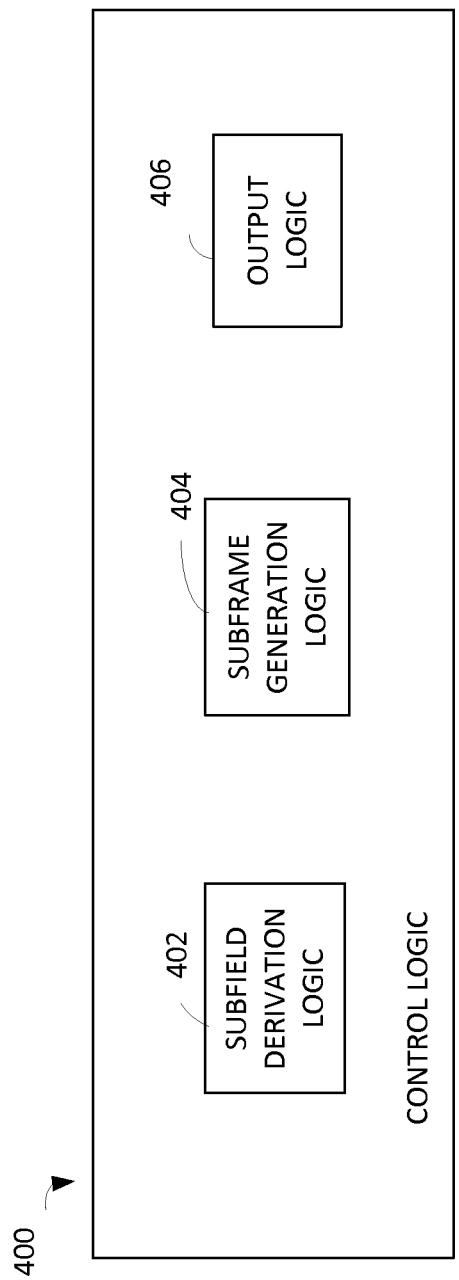
FIG. 4 shows a block diagram of example control logic suitable for use in the display apparatus shown in FIG. 3.

FIG. 4 shows a block diagram of example control logic 400 suitable for use as, for example, the control logic 306 in the display apparatus 300 shown in FIG. 3. More particularly, FIG. 4 shows a block diagram of functional modules executed by the microprocessor 316 and the I/F Chip 318. Each functional module can be implemented as software in the form of computer executable instructions stored on a tangible computer readable medium, which can be executed by the microprocessor 316 and/or as logic circuitry incorporated into the I/F Chip 318. The control logic 400 includes subfield derivation logic 402, subframe generation logic 404, and output logic 406. While shown as separate functional modules in FIG. 4, in some implementations, the functionality of two or more of the modules may be combined into one or more larger, more comprehensive modules. Together the components of the control logic 400 function to carry out a method for generating an image on a display.

Figure 5:
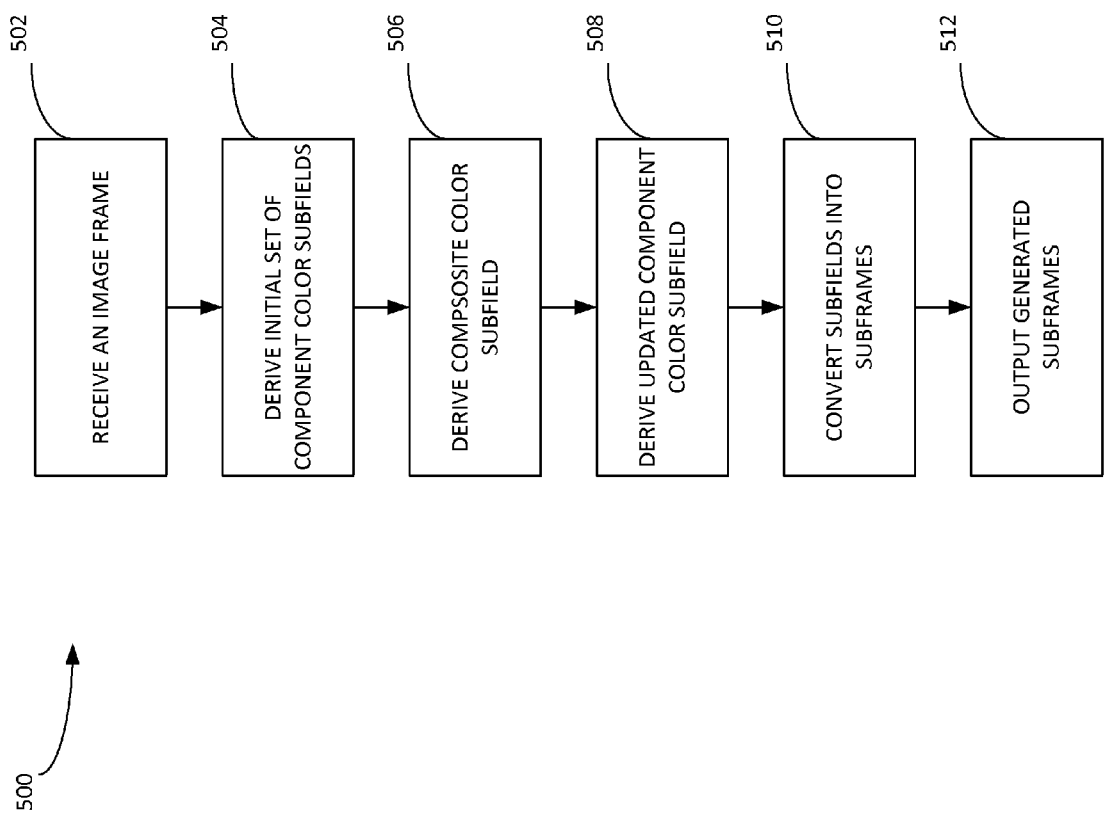
FIG. 5 shows a flow diagram of an example method for generating an image on a display using the control logic shown in FIG. 4.

FIG. 5 shows flow diagram of an example method 500 for generating an image on a display using the control logic 400 shown in FIG. 4. The method 500 includes receiving an image frame (stage 502), deriving an initial set of component color subfields (stage 504), deriving a composite color subfield (stage 506), deriving updated component color subfields (stage 508), converting the derived subfields into subframes (stage 510) and outputting the subframes (stage 512) to display the image.

The method 500 begins with the subfield derivation logic 402 receiving data associated with an image frame (stage 502). Typically, such image data is obtained as a stream of intensity values for the red, green, and blue components of each pixel in the image frame. The intensity values typically are received as binary numbers.

The subfield derivation logic 402 then derives and stores an initial set of component color subfields for the image frame based on the received image data (stage 504). Each color subfield includes for each pixel in the display an intensity value indicating the amount of light to be transmitted by that pixel, for that color, to form the image frame. A component color subfield refers to a subfield associated with a color that forms one of the vertices of the color gamut (represented in the x, y or other color space) reproduced by the display. For example, in the CIE 1931 color space, the component colors would be red, green, and blue.

In some implementations, the subfield derivation logic 402 derives the initial set of component color subfields (stage 504) by segregating the pixel intensity values for each primary color represented in the received image data (i.e., red, green, and blue). In some implementations, one or more image pre-processing operations, such as gamma correction and dithering, may also be carried out by the subfield derivation logic 402 prior to, or in the process of, deriving the initial set of component color subframes (stage 504).

After generating the initial set of component color subframes (stage 504), the subfield derivation logic 402 derives a composite color subfield (stage 506). A composite color subfield is a subfield associated with a composite color. Examples of such composite colors include white, yellow, cyan, magenta, orange, or any other color formed by combining two or more of a display's component colors to equal or varying degrees. In general, displaying an image using a composite color can help mitigate color break-up image artifacts and, in some cases, can reduce the power consumed by the display in generating images.

In one implementation in which the composite color subfield is a white subfield, the subfield derivation logic 402 derives the composite color subfield by identifying for each pixel the minimum of the intensity values associated with that pixel in the component color subfields. For example, consider a pixel having component color pixel intensity values of {R, G, B}={150, 100, 50}, where R corresponds to red, G corresponds to green, and B corresponds to blue. For such a pixel, the subfield derivation logic 402 would set the intensity value for the pixel in a white composite color subfield to 50. In some other implementations, the subfield derivation logic 402 sets the intensity value for a pixel in the composite color subfield to a fraction (such as 25%, 33%, 50%, 60%, 75%, etc.) of the minimum of the component color intensity values for the pixel. Two additional techniques for deriving a composite color subfield (stage 504) are described below in relation to FIGS. 7 and 10.

After the composite color subfield is derived (stage 506), the subfield derivation logic 402 derives an updated set of component color subfields (stage 508). More particularly, the subfield derivation logic 402 reduces the intensity values in the component color subfields to account for any light energy being output through the composite color subfield. For example, for the pixel discussed above with input pixel intensity values of {R, G, B}={150, 100, 50}, and a composite color intensity value {W}={50}, the subfield derivation logic 402 reduces the intensity values in each of the component color subfields by 50. The resulting set of intensity values for the pixel in each of the four subfields is {R, G, B, W}={100, 50, 0, 50}.

FIG. 6 shows an example processing of an image frame by the subfield derivation logic 402 shown in FIG. 4. FIG. 6 shows input image data 602 for an example four pixel-by-four pixel image. The input image data 602 includes red, green, and blue intensity values for each pixel in the image frame. FIG. 6 also shows output image data 604. The output image data 604 represents the output of the subfield derivation logic 402 after execution of the composite color subfield derivation stage (stage 506) and the updated component color derivation stage (stage 508) described above. For example, the set of pixel intensity values for the pixel in the upper-left hand corner of the image frame in the input image data 602, corresponding to the intensity values for that pixel in an initial set of component color subfields, is {R, G, B}={100, 150, 200}. The set of intensity values in the output image data 604 for the same pixel, corresponding to the pixel intensity values in the updated component color subfields and the composite color subfield for that pixel, is {R, G, B, W}={0, 50, 100, 100}. Similarly, for the pixel immediately to the right of that pixel, the set of pixel intensity values for the pixel in the input image data 602 is {R, G, B}={125, 75, 200}, and the set of intensity values in the output image data 604 for the same pixel is {R, G, B, W}={50, 0, 125, 75}.

Referring back to FIG. 5, the subframe generation logic 404 (shown in FIG. 4) then converts the derived subfields into sets of subframes (stage 510). Each subframe corresponds to a particular time slot in a time division gray scale image output sequence. It includes a desired state of each display element in the display for that time slot. In each time slot, a display element can take either a non-transmissive state or one or more states that allow for varying degrees of light transmission. In some implementations, subframes generated based on the component color subfields include a distinct state value for each display element in the array of display elements 310. In some implementations, as described further below, subframes generated based on a composite color subfield may be much smaller, as they can include state values that are shared by multiple display elements.

In some implementations, the subframe generation logic 404 uses a code word lookup table (LUT) to generate the subframes (stage 510). In some implementations the code word LUT stores a series of binary values referred to as code words that indicate a series of display element states that result in a given pixel intensity value. The value of each digit in the code word indicates a display element state (for example, light or dark) and the position of the digit in the code word represents the weight that is to be attributed to the state. In some implementations, the weights are assigned to each digit in the code word such that each digit is assigned a weight that is twice the weight of a preceding digit. In some other implementations, multiple digits of a code word may be assigned the same weight. In some other implementations, each digit is assigned a different weight, but the weights may not all increase according to a fixed pattern, digit to digit.

To generate a set of subframes (stage 510), the subframe generation logic 404 obtains code words for all pixels in a color subfield. The subframe generation logic 404 then aggregates the digits in each of the respective positions in the code words for each pixel together into subframes. For example, the digits in the first position of each code word for each pixel are aggregated into a first subframe. The digits in the second position of each code word for each pixel are aggregated into a second subframe, and so forth. The subframes, once generated, are stored in the frame buffer 308 shown in FIG. 3.

In some other implementations, particularly for implementations using light modulators capable of achieving one or more partially transmissive states, the code word LUT may store code words using base-3, base-4, base 10, or some other base number scheme.

After generating the subframes (stage 510), the output logic 406 of the control logic 400 (shown in FIG. 4) outputs the generated subframes (stage 512) to display the received image frame. Similar to as described above in relation to FIG. 3 with respect to the I/F chip 318, the output logic 406 outputs cause each subframe to be loaded into the array of display elements 310 (shown in FIG. 3) and illuminated according to an output sequence. In some implementations, the output sequence is configurable, and may be modified based on user preferences, the content of image data being displayed, external environmental factors, etc.

In some implementations, the output sequence may include more detailed information with respect to how each of the rows in the array of display elements 310 is to be addressed. For example, as described further below, in some implementations, the output sequence can cause composite color subframe data to be loaded into multiple rows simultaneously, while it causes component color subframe data to be loaded into each row, one row at a time. Examples of several such implementation are described further below in relation to FIGS. 7-11C.

To implement the output sequence, the output logic 406 outputs control signals to each of the drivers included in the display module 304. The output logic also communicates with the frame buffer 308 to either retrieve the appropriate subframe at the appropriate time for output to the display drivers 312 or to cause the frame buffer 308 to output the appropriate subframes directly to the display drivers 312.

As indicated above, much of the benefit of using a composite color subfield can be achieved through the use of a composite color subfield that includes composite color intensity values that are shared by multiple pixels arranged in groups or blocks.

Figure 7:
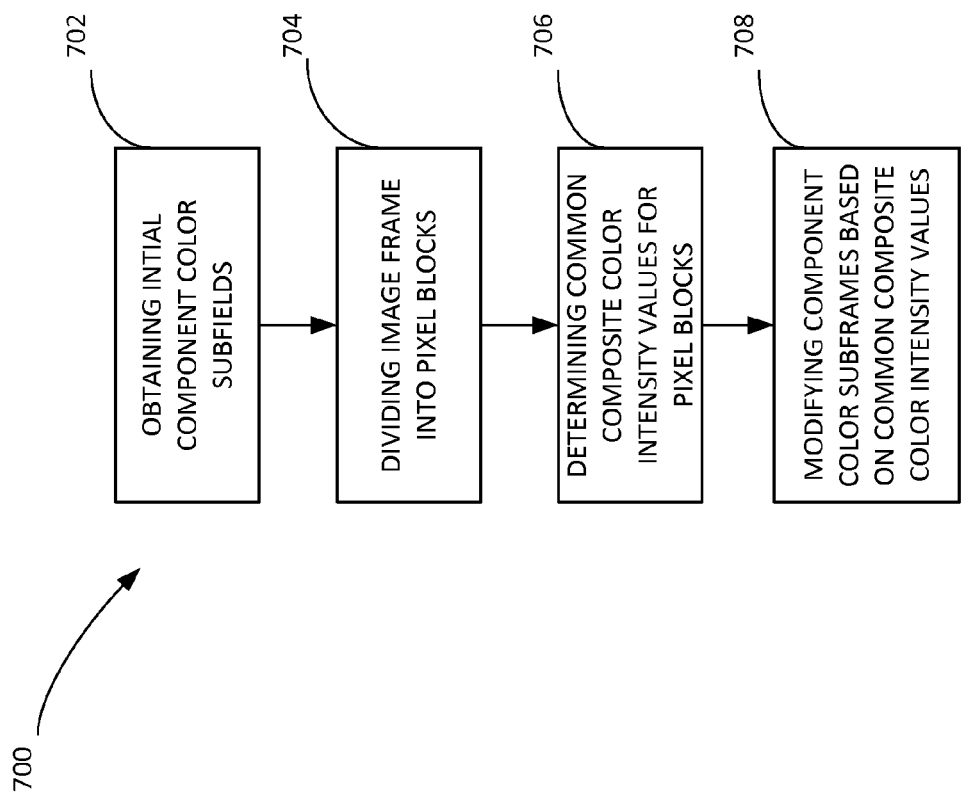
FIG. 7 shows a flow diagram of an example method of deriving color subfields.

FIG. 7 shows a flow diagram of an example method 700 of deriving color subfields. The method 700 can be employed by the control logic 400 shown in FIG. 4 and implemented in the microprocessor 316 of the display module 304 shown in FIG. 3. The method includes obtaining an initial set of component color subframes associated with an image frame (stage 702), dividing the image frame into blocks of pixels (stage 704), determining a common composite color intensity value to be shared by the pixels in the block of pixels (stage 706), and modifying the component color subframes based on the determined composite color intensity values (stage 708).

The color subfield derivation method 700 begins with obtaining an initial set of component color subfields associated with an image frame (stage 702). In some implementations, the component color subfields are obtained by the subfield derivation logic 402 deriving the subfields as described above with respect to stage 504 of the method 500 shown in FIG. 5. In some other implementations, the component color subfields are retrieved from a memory device included in the display module 304.

Figure 8:
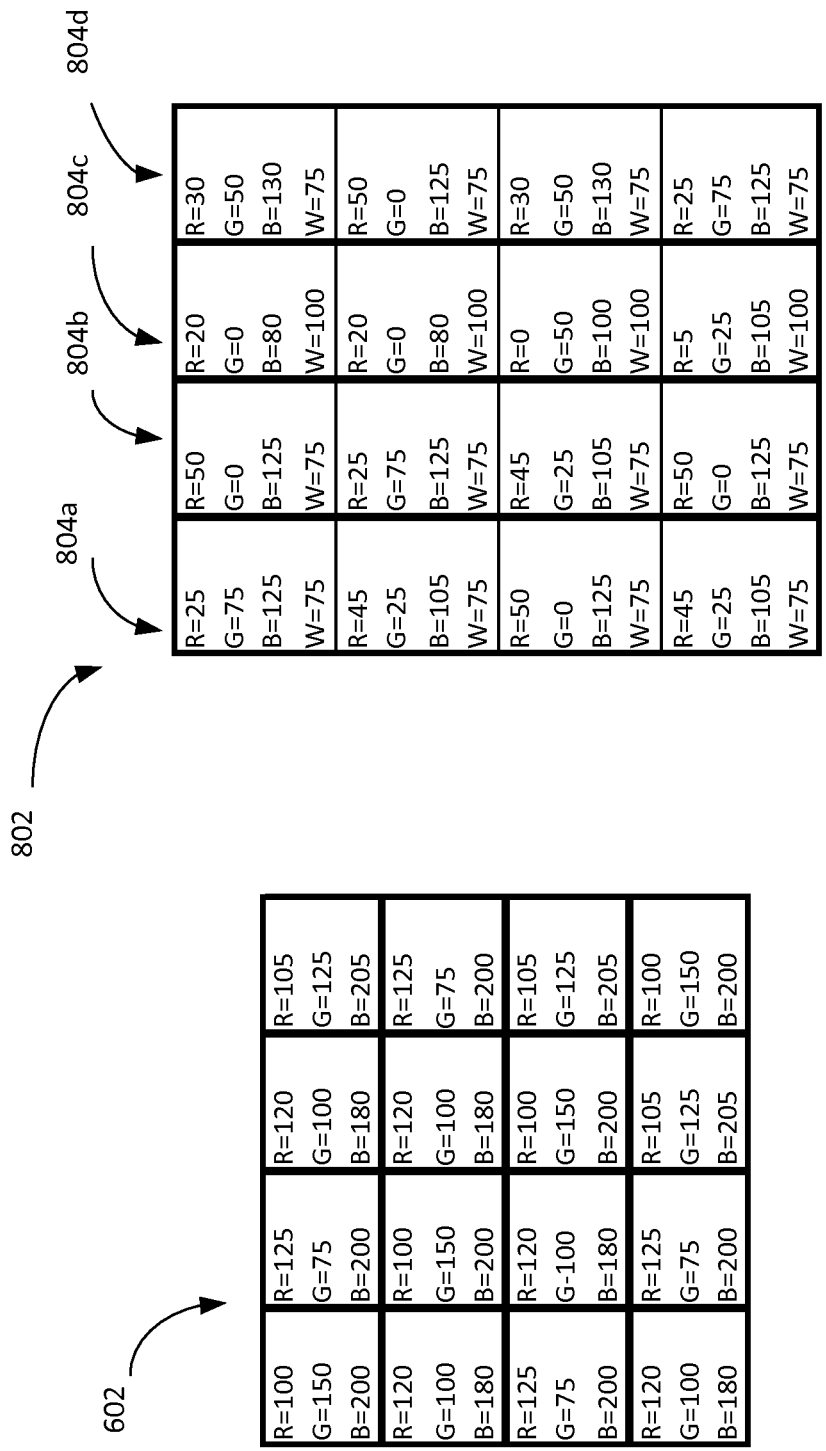
FIGS. 8 and 9 show example executions of the color subfield derivation method shown in FIG. 7.
Figure 9:
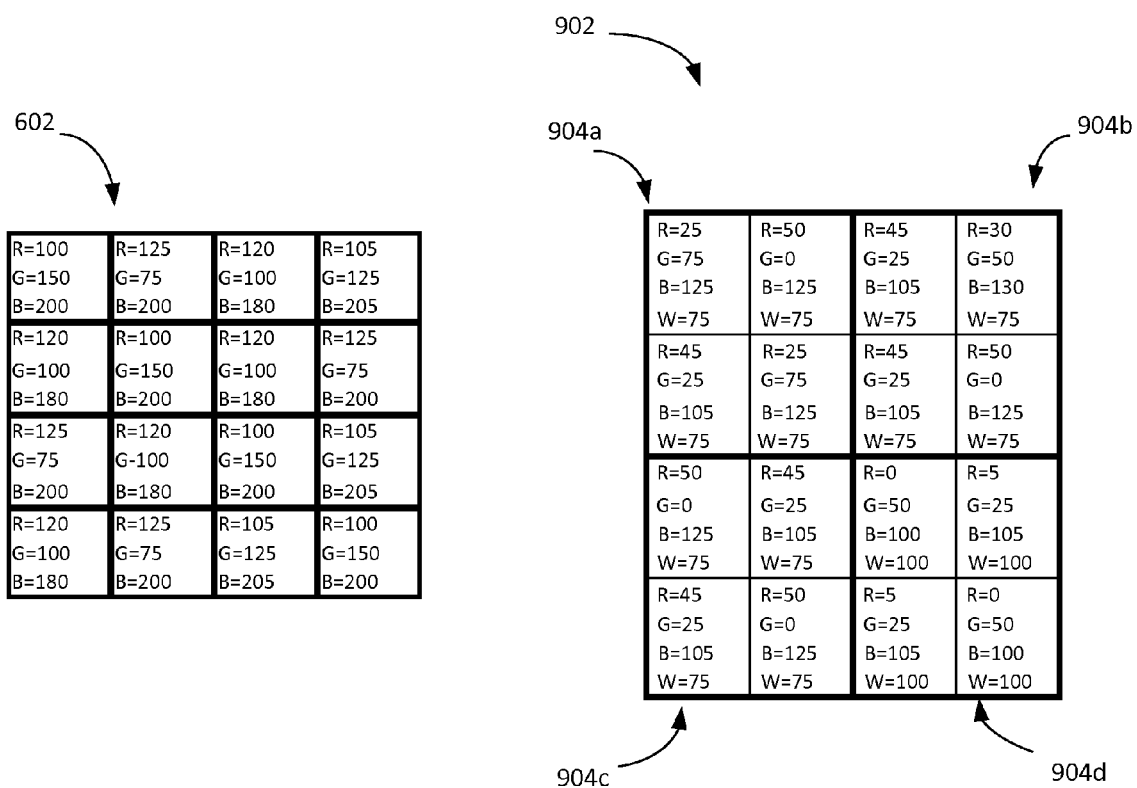

The subfield derivation logic 402 divides the image frame into blocks of pixels (stage 704). In some implementations, an example of which is shown in FIG. 8, described further below), the subfield derivation logic 402 groups pixels into one-dimensional blocks along each column. For example, the subfield derivation logic 402 may group the pixels in each column into groups of between 2 and 25 (or in some cases more) adjacent pixels. In some other implementations, the subfield derivation logic 402, an example of which is shown in FIG. 9, the subfield derivation logic 402 groups the pixels of the image frame into two-dimensional blocks. For example, the subfield derivation logic 402 may group the pixels in the image frame into groups of 2×2, 4×4, 10×10, 5×10, 10×20 or any other sized block of pixels.

Then, for each block of pixels, the subfield derivation logic 402 determines a common composite color intensity value to be shared by the pixels in the block (stage 706). In some implementations, the subfield derivation logic 402 selects the minimum of the respective composite color pixel intensity values that would have been selected for the individual pixels were they not grouped into blocks. In some other implementations, the subfield derivation logic selects the minimum intensity value across all component color subfields for all pixels in the pixel block. The selected composite color pixel intensity value is then saved for the block of pixels. In some implementations, the selected value is saved in a single memory location, which is commonly associated with all pixels in the block of pixels for the composite color subfield. In some other implementations, the selected value is stored in separate memory locations for each pixel in the composite color subfield.

In some other implementations, prior to dividing an image frame into blocks and determining a common composite color intensity value for each block, the image frame (or the initial component color subfields) is preprocessed using a Fourier domain filtering process. In some such implementations, the image data is processed by a two-dimensional spatial Fourier transform. The result is processed using a low-pass filter to filter out high spatial-frequency color changes. The results of the filtering process are then processed using an inverse Fourier transform to yield a filtered image frame or filtered component color subfields. In such implementations, the common composite color intensity value is determined using the filtered image frame or the filtered component color subfields, instead of the initial component color subfields.

After the subfield derivation logic 402 derives the composite color subfield, the subfield derivation logic 402 modifies the previously obtained component color subfields (stage 708). The subfield derivation logic 402 carries out this stage much in the same manner as set forth in stage 508 of the method 500 shown in FIG. 5. That is, the subfield derivation logic 402 reduces the intensity values for each pixel in each of the component color subfields that are combined to form the composite color to account for the light output through the composite color subfield. For example, for a white composite color subfield, the intensity values of the pixels in each of the red, green, and blue component color subfields are reduced. For a yellow composite color subfield, the intensity values for the pixels are only reduced in the red and green component color subfields.

FIG. 8 shows an example execution of the color subfield derivation method 700 shown in FIG. 7. More particularly, FIG. 8 shows an example execution of the method 700 in which the subfield derivation logic 402 groups pixels into one-dimensional blocks of pixels for the derivation of a composite color subfield. FIG. 8 shows the same input image data 602 shown in FIG. 6, along with output image data 802 in which component color subfields formed from the input image data 602 have been processed using one-dimensional pixel blocks 804a-804d to derive a white composite color subfield. Each pixel block 804 includes four pixels. While the pixel blocks 804a-804d each make up the entirety of their respective columns in FIG. 8, this is merely an artifact of the illustrative input into data 602, which includes only 16 pixels. In practice, each column is broken into between 25 and 500 pixel blocks, depending on the size and resolution of the display module and the size of the pixel blocks.

As set forth above with respect to stage 706 shown in FIG. 7, the intensity values for the white composite color subfield, depicted as the values of W in the output image data 802, are derived by selecting the minimum of the composite color intensity values that would have been selected for respective pixels in each pixel block 804a-804d. Given that the output image data 802 was derived from the same input image data 602 shown in FIG. 6, the composite color intensity values that would been selected for each individual pixel, without any pixel grouping, can be found in the output image data 604, also shown in FIG. 6. For the first pixel block 804a, the composite color intensity values of the individual pixels in the pixel block 804a absent any grouping, from top to bottom, would have been 100, 100, 75, 100. Accordingly, in the example shown in FIG. 8, the subfield derivation logic 402 sets the intensity value in the composite color subfield for the first pixel block 804a, to 75. Similarly, for the second pixel block 804b, the subfield derivation logic 402 sets the intensity value in the composite color subfield to the minimum of 75, 100, 100, and 75, i.e., 75. For the third and fourth pixel blocks 804c and 804d, the subfield derivation logic 402 sets their respective intensity values in the composite color subfield to 100 and 75.

The output image data 802 also reflects the updates made to the initial set of component color subfields to reflect the intensity values selected for use in the composite color subfield. For example, for pixels in the first pixel block 804a, the intensity values for each pixel in each component color subfield is 75 less than the initial intensity value for the pixel in that component color subfield. The intensity values for the pixels in the remaining pixel blocks 804b-804d have been reduced by 75, 100, and 75 respectively.

As a result of each pixel in a given pixel block 804a-804d having a common composite color intensity values, those pixel intensity values can be loaded into all display elements associated with the pixel block 804a-804d simultaneously. To simultaneously load a common data value into multiple display elements located in adjacent rows in a given column, the scan-line drivers of a display simultaneously apply a write enabling voltage to multiple adjacent scan-line interconnects, write-enabling each of the display elements in the rows corresponding to the scan-line interconnects. At the same time, the common data voltage is applied to the data interconnect associated with the column of display elements, thereby loading the data voltage into each of the write-enabled display elements in the column.

FIG. 9 shows another example execution of the color subfield derivation method 700 shown in FIG. 7. More particularly, FIG. 9 shows an example execution of the method 700 in which the subfield derivation logic 402 groups pixels into two-dimensional blocks of pixels for the derivation of a composite color subfield. FIG. 9 includes the same input image data 602 shown in FIGS. 6 and 8, along with output image data 902 in which component color subfields formed from the input image data 602 have been processed using 2 pixel-by-2 pixel blocks 904a-904d to derive a white composite color subfield.

Similar to as was done above, the intensity values for the white composite color subfield, depicted as the values of W in the output image data 902, are derived by selecting the minimum of the composite color intensity values that would have been selected for respective pixels in each pixel block 904a-904d. Given that the output image data 902 was derived from the same input image data 602 shown in FIG. 6, the composite color values that would been selected for each individual pixel, without any pixel grouping, can be found in the output image data 604, also shown in FIG. 6. For the first pixel block 904a, the composite color intensity values of the individual pixels in the pixel block 904a absent any grouping, would have been 100, 75, 100, 100. Accordingly, in the example shown in FIG. 9, the subfield derivation logic 402 sets the intensity value in the composite color subfield for the first pixel block 904a to 75. Similarly, for the second pixel block 904b, the subfield derivation logic 402 sets the intensity value in the composite color subfield to the minimum of 100, 105, 100, and 75, i.e., 75. For the third and fourth pixel blocks 904c and 904d, the subfield derivation logic 402 sets their respective intensity values in the composite color subfield to 75 and 100.

The output image data 902 also reflects the updates made to the initial set of component color subfields to reflect the intensity values selected for use in the composite color subfield. For example, for pixels in the first pixel block 804a, the intensity values for each pixel in each component color subfield is 75 less than the initial intensity value for the pixel in that component color subfield. The intensity values for the pixels in the remaining pixel blocks 804b-804d have been reduced by 75, 75, and 100 respectively.

In the output image data 802 and 902 shown in FIGS. 8 and 9, the common intensity values in the composite color subfields shared by the pixels in each pixel block varied relatively little from the intensity values that would have been set for those pixels were the composite color intensity values determined without any grouping of pixels. However, for some image frames, this will not always be the case. Grouping pixels that have substantially different intensity levels of a composite color into a common pixel block can potentially lead to image artifacts. As such, in some implementations, stage 704 shown in FIG. 7, in which a received image frame is divided into pixel blocks, can be modified to prevent grouping pixels together that have overly disparate composite color intensity levels.

Figure 10:
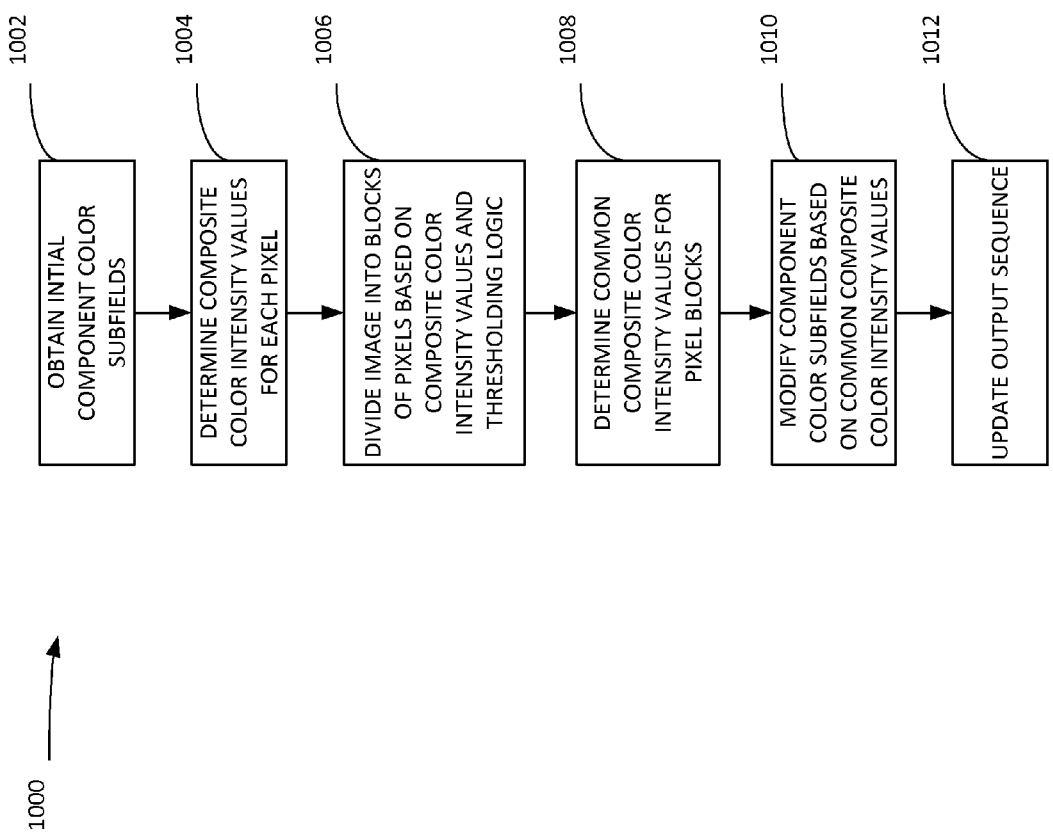
FIG. 10 shows a flow diagram of an example method of processing an image using dynamic pixel grouping.

FIG. 10 shows a flow diagram of an example method 1000 of processing an image using dynamic pixel grouping. More particularly, the method 1000 incorporates thresholding logic to prevent the grouping of pixels having overly disparate composite color intensity levels. The method 1000 can be employed by the control logic 400 shown in FIG. 4 and implemented in the microprocessor 316 in the display module 304 shown in FIG. 3. The method 1000 includes obtaining an initial set of component color subframes associated with an image frame (stage 1002), determining a composite color pixel intensity value for each pixel in the image frame (stage 1004), dividing the image frame into blocks of pixels based on the determined composite color intensity values and thresholding logic (stage 1006), determining a common composite color intensity value to be shared by the pixels in each block of pixels (stage 1008), and modifying the component color subframes based on the determined composite color pixel intensity values (stage 1010). The control logic 400 then updates the output sequence used by the output logic 406 for displaying the image frame, based on the determined division of the image (stage 1012).

The method 1000 begins in a similar fashion as the method 7000 shown in FIG. 7, by obtaining an initial set of component color subframes associated with an image frame (stage 1002). Then, a composite color intensity value is determined for each pixel in the image frame (stage 1004). As described above, if the composite color is white, the composite color intensity value can be determined for a pixel by identifying the minimum of the component color intensity values for that pixel or some selected fraction thereof.

Based on the determined composite color intensity values and thresholding logic, the pixels of the input image frame are grouped into pixel blocks (stage 1006). To group the pixels, the subframe derivation logic 402 attempts to group pixels into blocks (either one-dimensional or two-dimensional) by adding pixels to a previous pixel block, one row of pixels at a time. In doing so, the derivation logic compares the composite color intensity value of each pixel in the row to the composite color intensity value of one or more pixels already included in an existing pixel block (or to a function thereof) to which the pixel may be added, thereby deriving a composite color difference value. For example, in some implementations, the composite color difference value for a pixel is set equal to the difference between the composite color intensity value of the pixel and the composite color intensity value of the pixel in the same column in the immediately preceding row. In some other implementations, the composite color difference value for a pixel is set equal to the difference between the composite color intensity value of the pixel and the mean or median of the composite color intensity values of all pixels already included in the pixel group to which it may be added.

The composite color difference value for each pixel is then compared to a threshold. The threshold can be fixed, or it can be based on statistical characteristics (for example the variance or standard deviation, or some multiple or fraction thereof) of the pixel group to which the pixel may be added. In some implementations, if the composite color difference value for any pixel in a row exceeds the threshold, the control logic 400 refrains from adding pixels in that row to the pixel blocks that include the pixels from the prior rows. Instead, the control logic starts a new set of pixel blocks to include the new row of pixels. In some implementations, the control logic only starts a new set of pixel blocks if more than a threshold number of pixels in a given row have difference values that exceed the threshold. In some other implementations, the control logic also may set a maximum size for each pixel block. The maximum size may be set, in some implementations, based on the capacity of the memory used to store pixel data during the image frame division stage. For example, the memory may be limited to holding between about 10 and about 25 rows of image data.

After the control logic 400 determines that a given set of pixel blocks is complete and that no more pixels will be added to the block, the control logic determines a set of common composite color intensity values for each of the respective pixel blocks in the pixel block set (stage 1008). Similar to as described above in relation to subfield derivation method 700, shown in FIG. 7, the common composite color intensity value for a pixel block can be set to the minimum composite color intensity value of the pixels included in the pixel block or to a selected fraction of such minimum value. The intensity values in each of the component color subfields for the pixels in the set of pixel blocks are then reduced based on the common composite color intensity values selected for such pixels (stage 1010). In some other implementations, this stage (stage 1010) of the method 1000 can occur after of the common composite color intensity values for all pixels in the image frame are selected.

After the image frame has been divided into pixel blocks (stage 1006), the output logic adjusts the output sequence used to display the image frame (stage 1012) based on the number of pixel blocks the image frame has been divided into. As described above, using composite color intensity values that are shared by pixels in multiple adjacent rows allows for the composite color image data to be loaded into an array of display elements faster, as multiple rows can be addressed simultaneously. The resulting time savings can be used by the control logic to output an image in a more energy efficient manner or to display it in a manner that may mitigate potential image artifacts. For example, one or more subframes can be illuminated for longer durations at lower illumination intensities, the duration for which one more subframes is displayed can be split such that such subframes are displayed more than once, and/or additional lower weighted subframes can be shown for one or more component color subfields. In the method 1000, the time savings that can be reaped from grouping pixels into blocks for the composite color subfield can vary from image frame to image frame based on how many pixel blocks the control logic divides the image into. Accordingly, after an image frame is divided (stage 1006), the control logic 400 can determine the amount of time needed to address a display with the composite color data, and adjust the output sequence to account for the particular amount of time saved.

FIGS. 11A-11C show an example execution of the image processing method 1000 shown in FIG. 10. FIG. 11A shows an example input image frame 1102 to be processed via the method 1000. FIG. 11B shows an example set of composite color intensity values 1120 determined for the pixels included in the input image frame 1102 at stage 1004 of the method 1000. FIG. 11C shows example output data 1150 generated by the method 1000.

Referring to FIG. 11A, the input image frame 1102 includes pixels having the same component color intensity values as the pixels shown in the input image data 602, except for two pixels 1104 and 1106 in the lower left hand corner of the input image frame 1102. In particular, the pixels 1104 and 1106 have substantially higher intensity levels of red and blue than the corresponding pixels in the input image data 602. In addition, the pixel 1104 has a significantly greater blue intensity than its corresponding pixel in the input image data 602.

As indicated above, FIG. 11B shows an example set of composite color intensity values 1120 determined for the pixels included in the input image frame 1102 at stage 1004 of the method 1000. For each pixel, the composite color is white, and its intensity value is determined to be equal to the minimum value of the red, green, and blue intensity values of the pixel in the input image frame 1102. As can be seen in FIG. 11B, the composite color intensity values 1122 and 1124 for the pixels 1104 and 1106 are at least twice the composite color intensity values 1126 and 1128 of the pixels 1108 and 1110 (shown in 11A) positioned immediately above them. In contrast, the differences between the composite color intensity values of the remaining pixels are much smaller.

FIG. 11C shows example output data 1150 generated by the method 1000 based on the input image frame 1102 shown in FIG. 11A and the determined composite color intensity values shown in FIG. 11B. Referring to FIGS. 11A-11C, the output data 1150 shows the pixels grouped into six different pixel blocks 1152a-1152f (generally pixel blocks 1152). Each pixel block 1152 includes pixels in two adjacent columns. Accordingly, as the composite color intensity values of the four pixels in the upper left hand corner of the image frame (i.e., 100, 75, 100, 100) and the composite color intensity values of the four pixels in the upper right hand corner of the image frame (i.e., 100, 105, 100, 75) are relatively close, the respective sets of four pixels are grouped into pixel blocks 1152a and 1152b.

In the example execution of the method 1000 shown in FIGS. 11A-11C, the maximum number of rows allowed to be included in an pixel block is two. Thus, even though the composite color intensity values of the pixels in the third row of the output data 1150 are not substantially different from those in the second row of the output 1150, the pixels in the third row are grouped into new pixel blocks 1152c and 1152d. On the other hand, as indicated above, the composite color intensity values 1122 and 1124 of the pixels 1104 and 1106 are substantially different than the composite color intensity values 1126 and 1128 of the pixels 1108 and 1110. Thus, the pixels 1104 and 1106 are not added to the pixel block 1152c. In addition, even though the composite color intensity values 1132 and 1134 of the two right-most pixels 1112 and 1114 in the fourth row of the image frame are substantially similar to the composite color intensity values of the pixels above them, because some pixels in the fourth row justify the creation of a new pixel block 1152e, the pixels 1112 and 1114 are likewise grouped into a new pixel block 1152f.

In each pixel block 1152a-1152f, a common composite color intensity value has been set to the minimum of the composite color intensity values of the pixels included in the respective pixel block 1152a-1152f. Accordingly, the composite color intensity values in the pixel blocks 1152a-1152f are set to 75, 75, 75, 100, 200, and 100, respectively. The component color intensity values for each pixel are shown as updated based on the common composite color intensity value set for the pixel block in which the pixels are located.

Figure 12:
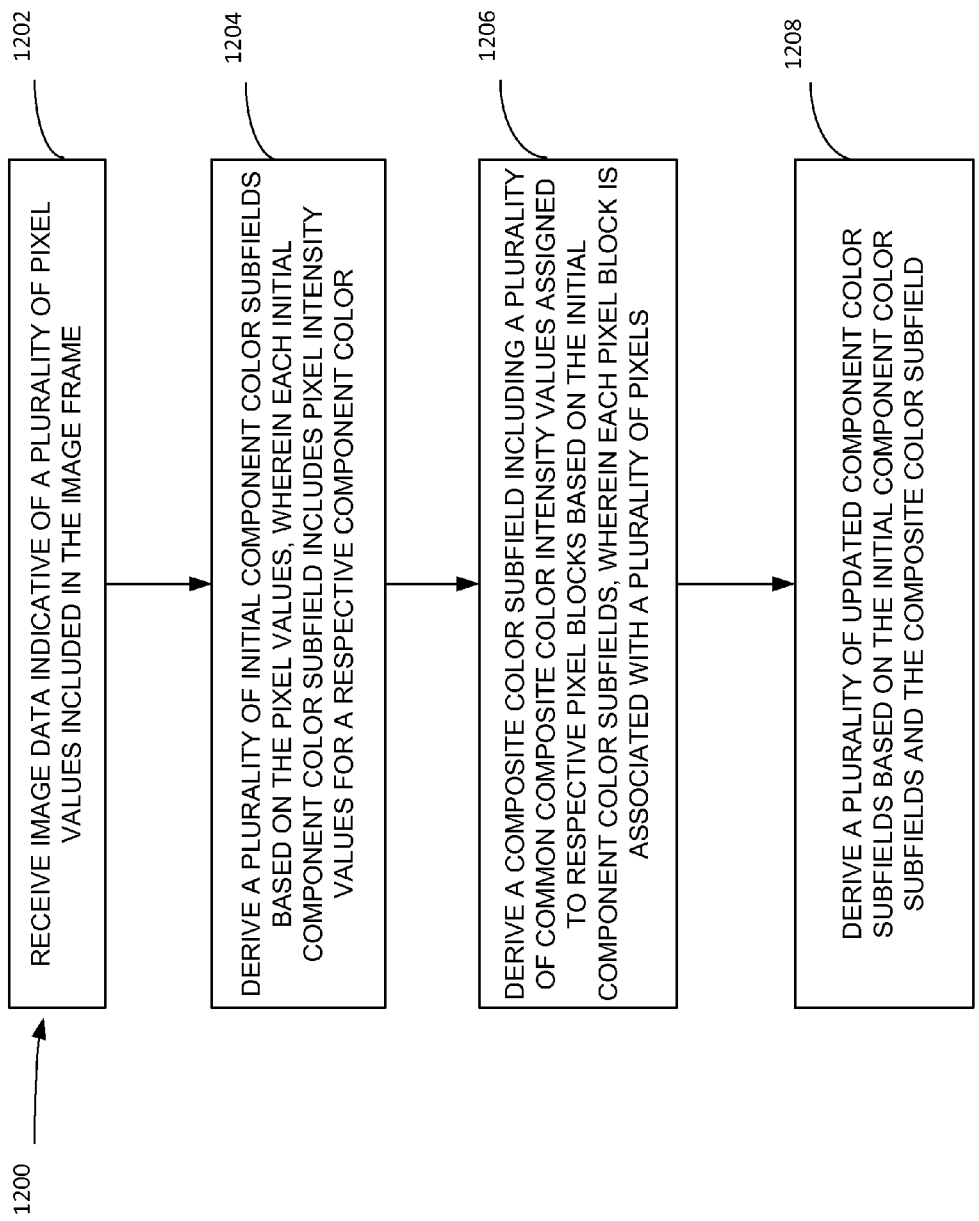
FIG. 12 shows a flow diagram of an example method 1200 of processing an image frame for display.

FIG. 12 shows a flow diagram of an example method 1200 of processing an image frame for display. The method 1200 combines aspects of the methods 500 and 700 shown in FIGS. 5 and 7, respectively. Referring to FIGS. 5, 7, and 12, the method 1200 includes receiving image data indicative of a plurality of pixel values included in the image frame (stage 1202). Such image data can be received in substantially the same fashion as described in relation to stage 502 of the method 500. The method further includes deriving a plurality of initial component color subfields based on the pixel values, where each initial component color subfield includes pixel intensity values for a respective component color (stage 1204). The initial component color can be derived in substantially the same fashion as described above in relation to stage 504 of the method 500. In addition, a composite color subfield is derived that includes a plurality of common composite color intensity values assigned to respective pixel blocks based on the initial component color subfields, where each pixel block is associated with a plurality of pixels (stage 1206). The composite color subfield can be derived in substantially the same fashion as described in relation to stage 706 of the method 700. Then, a plurality of updated component color subfields are derived based on the initial component color subfields and the composite color subfield (stage 1208). The updated component color subfields can be derived as described above with respect to stage 708 of the method 700.

FIGS. 13A and 13B show system block diagrams of an example display device 50 that includes a plurality of display elements. The display device 50 can be, for example, a smart phone, a cellular or mobile telephone. However, the same components of the display device 50 or slight variations thereof are also illustrative of various types of display devices such as televisions, computers, tablets, e-readers, hand-held devices and portable media devices.

The display device 50 includes a housing 51, a display 30, an antenna 53, a speaker 55, an input device 58 and a microphone 56. The housing 51 can be formed from any of a variety of manufacturing processes, including injection molding, and vacuum forming. In addition, the housing 51 may be made from any of a variety of materials, including, but not limited to: plastic, metal, glass, rubber and ceramic, or a combination thereof. The housing 51 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 50 are schematically illustrated in FIG. 13B. The display device 50 includes a housing 51 and can include additional components at least partially enclosed therein. For example, the display device 50 includes a network interface 27 that includes an antenna 53 which can be coupled to a transceiver 57. The network interface 27 may be a source for image data that could be displayed on the display device 50. Accordingly, the network interface 27 is one example of an image source module, but the processor 21 and the input device 58 also may serve as an image source module. The transceiver 57 is connected to a processor 21, which is connected to conditioning hardware 52. The conditioning hardware 52 may be configured to condition a signal (such as filter or otherwise manipulate a signal). The conditioning hardware 52 can be connected to a speaker 55 and a microphone 56. The processor 21 also can be connected to an input device 58 and a driver controller 29. The driver controller 29 can be coupled to a frame buffer 28, and to an array driver 22, which in turn can be coupled to a display array 30. One or more elements in the display device 50, including elements not specifically depicted in FIG. 13A, can be configured to function as a memory device and be configured to communicate with the processor 21. In some implementations, a power supply 50 can provide power to substantially all components in the particular display device 50 design.

The network interface 27 includes the antenna 53 and the transceiver 57 so that the display device 50 can communicate with one or more devices over a network. The network interface 27 also may have some processing capabilities to relieve, for example, data processing requirements of the processor 21. The antenna 53 can transmit and receive signals. In some implementations, the antenna 53 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 53 transmits and receives RF signals according to the Bluetooth® standard. In the case of a cellular telephone, the antenna 53 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 5G or 5G technology. The transceiver 57 can preprocess the signals received from the antenna 53 so that they may be received by and further manipulated by the processor 21. The transceiver 57 also can process signals received from the processor 21 so that they may be transmitted from the display device 50 via the antenna 53.

In some implementations, the transceiver 57 can be replaced by a receiver. In addition, in some implementations, the network interface 27 can be replaced by an image source, which can store or generate image data to be sent to the processor 21. The processor 21 can control the overall operation of the display device 50. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 50. The conditioning hardware 52 may include amplifiers and filters for transmitting signals to the speaker 55, and for receiving signals from the microphone 56. The conditioning hardware 52 may be discrete components within the display device 50, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a standalone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 58 can be configured to allow, for example, a user to control the operation of the display device 50. The input device 58 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 56 can be configured as an input device for the display device 50. In some implementations, voice commands through the microphone 56 can be used for controlling operations of the display device 50.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
an array of light modulators including a plurality of light modulators arranged in multiple rows and multiple columns;
a controller coupled to the array of light modulators configured to:
receive data indicative of a plurality of pixel values included in an image frame;
derive a plurality of initial component color subfields based on the pixel values,
wherein each initial component color subfield includes intensity values for a respective component color;
divide the image frame into a plurality of pixel blocks, wherein each pixel block is associated with a plurality of pixels;

derive a composite color subfield including a plurality of common composite color intensity values assigned to a plurality of respective pixel blocks, wherein for each pixel block, a single common composite color intensity value is derived for the plurality of pixels associated with only that pixel block based on the respective intensity values for the pixels associated with that pixel block in at least two of the initial component color subfields; and derive a plurality of updated component color subfields, including updated component color pixel values for the pixels in the plurality of respective pixel blocks, based on the initial component color subfields and the composite color subfield; and a memory configured to store subframe data associated with color subfields, wherein the memory is configured to store less data in association with the composite color subfield than in association with the component color subfields.

2. The apparatus of claim 1, wherein the controller is further configured to load at least one image subframe corresponding to the composite color subfield into the array of light modulators multiple rows at a time.

3. The apparatus of claim 1, wherein deriving a composite color subfield includes, for each pixel block, identifying a minimum composite color intensity value for the pixels associated with the pixel block.

4. The apparatus of claim 1, wherein deriving a composite color subfield includes, for each pixel block, identifying a minimum component color intensity value for the pixels associated with the pixel block.

5. The apparatus of claim 1, wherein deriving the plurality of updated component color subfields includes reducing the intensity values for pixels in the initial component color subfields by the common composite color intensity values of the respective pixel blocks.

6. The apparatus of claim 1, wherein the pixel blocks include pixels in multiple adjacent rows of the image frame.

7. The apparatus of claim 1, wherein the pixel blocks include pixels in multiple adjacent rows and multiple adjacent columns of the image frame.

8. The apparatus of claim 1, wherein dividing the image frame into the pixel blocks includes:
calculating a difference between a color intensity value associated with a pixel and at least one color intensity value associated with at least one pixel in an existing pixel block;
comparing the difference to a threshold; and
adding the pixel to a new pixel block in response to the difference exceeding the threshold.

9. The apparatus of claim 1, further comprising:
a display;
a processor that is configured to communicate with the display, the processor being configured to process image data; and
a memory device that is configured to communicate with the processor.

10. The apparatus of claim 9, the display further including:
a driver circuit configured to send at least one signal to the display,
wherein the controller is configured to send at least a portion of the image data to the driver circuit.

11. The apparatus of claim 9, the display further including:
an image source module configured to send the image data to the processor, wherein the image source module comprises at least one of a receiver, transceiver, and transmitter.

12. The apparatus of claim 9, the display further including:
an input device configured to receive input data and to communicate the input data to the processor.

13. A method of processing an image frame for display comprising:
receiving image data indicative of a plurality of pixel values included in the image frame;
deriving a plurality of initial component color subfields based on the pixel values, wherein each initial component color subfield includes pixel intensity values for a respective component color;
dividing the image frame into a plurality of pixel blocks, wherein each pixel block is associated with a plurality of pixels;
deriving a composite color subfield including a plurality of common composite color intensity values assigned to a plurality of respective pixel blocks, wherein for each pixel block, a single common composite color intensity value is derived for the plurality of pixels associated with only that pixel block based on the respective intensity values for the pixels associated with that pixel block in at least two of the initial component color subfields;
deriving a plurality of updated component color subfields including updated component color pixel values for the pixels in the plurality of respective pixel blocks, based on the initial component color subfields and the composite color subfield; and
storing subframe data associated with color subfields in a memory including storing less data in association with the composite color subfield than data in association with the component color subfields.

14. The method of claim 13, wherein deriving a composite color subfield includes, for each pixel block, identifying a minimum composite color intensity value for the pixels associated with the pixel block.

15. The method of claim 13, wherein the pixel blocks include pixels in multiple adjacent rows of the image frame.

16. The method of claim 13, wherein dividing the image into pixel blocks includes:
calculating a difference between a color intensity value associated with a pixel and at least one color intensity value associated with at least one pixel in an existing pixel block;
comparing the difference to a threshold; and
adding the pixel to a new pixel block in response to the difference exceeding the threshold.

17. A non-transitory processor readable medium storing instructions, which, when executed by one or more processors, cause the one or more processors to carry out a method comprising:
receiving data indicative of a plurality of pixel values included in an image frame;
deriving a plurality of initial component color subfields, wherein each initial component color subfield includes pixel intensity values for a respective component color;
dividing the image frame into a plurality of pixel blocks, wherein each pixel block is associated with a plurality of pixels;
deriving a composite color subfield including a plurality of common composite color intensity values assigned to a plurality of respective pixel blocks, and wherein for each pixel block, a single common composite color intensity value is derived for the plurality of pixels associated with only that pixel block based on the respective intensity values for the pixels associated with that pixel block in at least two of the initial component color subfields;

deriving a plurality of updated component color subfields including updated component color pixel values for the pixels in the plurality of respective pixel blocks, based on the initial component color subfields and the composite color subfield; and storing subframe data associated with color subfields in a memory including storing less data in association with the composite color subfield than data in association with the component color subfields.

18. The non-transitory processor readable medium of claim 17, wherein dividing the image frames includes dividing the image frame into pixel blocks based on the content of the image.

\* \* \* \* \*